United States Patent
Malov et al.

(10) Patent No.: US 8,577,791 B2
(45) Date of Patent: Nov. 5, 2013

(54) SYSTEM AND COMPUTER PROGRAM FOR MODELING AND PRICING LOAN PRODUCTS

(75) Inventors: Denis Malov, Scottsdale, AZ (US); Wei Sun, Scottsdale, AZ (US); Gustavo Ayres de Castro, Scottsdale, AZ (US)

(73) Assignee: SAP AG, Walldorf (DE)

( * ) Notice: Subject to any disclaimer, the term of this patent is extended or adjusted under 35 U.S.C. 154(b) by 1034 days.

(21) Appl. No.: 11/690,377

(22) Filed: Mar. 23, 2007

(65) Prior Publication Data

US 2008/0235130 A1    Sep. 25, 2008

(51) Int. Cl.
*G06Q 40/00*    (2012.01)
*G06Q 40/02*    (2012.01)

(52) U.S. Cl.
CPC .................... *G06Q 40/025* (2013.01); *G06Q 40/00* (2013.01); *G06Q 40/02* (2013.01)
USPC ........................................................ 705/38

(58) Field of Classification Search
USPC ........................................................ 705/38
See application file for complete search history.

(56) References Cited

U.S. PATENT DOCUMENTS

| | | | | |
|---|---|---|---|---|
| 6,032,125 A * | 2/2000 | Ando | | 705/10 |
| 6,185,543 B1 * | 2/2001 | Galperin et al. | | 705/38 |
| 6,438,526 B1 * | 8/2002 | Dykes et al. | | 705/38 |
| 6,553,352 B2 * | 4/2003 | Delurgio et al. | | 705/400 |
| 7,328,164 B2 * | 2/2008 | Krikler et al. | | 705/1 |
| 2004/0225594 A1 * | 11/2004 | Nolan et al. | | 705/38 |
| 2005/0222926 A1 * | 10/2005 | Sarkar et al. | | 705/35 |

OTHER PUBLICATIONS

Bester, Helmut; Screening vs. Rationing in Credit Markets with Imperfect Information; The American Economic Review, vol. 75, No. 4 (Sep. 1985), pp. 850-855: American Economic Association; available online @ http://www.jstor.org/stable/1821362; last accessed Jun. 18, 2009.*

Maximizing Profits and Achieving Target Volumes Through Price Optimization, SAP Industry Briefing, 2006, SAP AG.

* cited by examiner

*Primary Examiner* — James Trammell
*Assistant Examiner* — Daniel L Greene
(74) *Attorney, Agent, or Firm* — Buckley, Maschoff & Talwalkar LLC

(57) ABSTRACT

A computing system (100) receives transaction records (130) for loans taken at various interest rates (1904) for a loan segment (902). Performance indicators (1716) indicative of customer behaviors (1702) are computed (1806) using independent demand models (300, 302, 304, 306, and 308). Computing system (100) includes a performance indicator forecaster (112) that determines relationships between the performance indicators (1716) and various prices, or interest rates (1904). These relationships can include profit (1906) and/or volume (1908) relative to the various interest rates (1904). The relationships are utilized to select an interest rate (1912, 2102) for the product segment (902) for implementation by a financial institution.

22 Claims, 16 Drawing Sheets

| LOAN/ TRANSACTION RECORD ID | PRODUCT SEGMENT ID | RATE | DEMAND TYPE/ TRANSACTION PARAMETERS | STATE INDICATOR | MODEL ID(S) |
|---|---|---|---|---|---|
| 006-522 | 113662 | 6.62 | HEL/ ... | CLOSED | AGE ID |
| 002-012 | 200321 | 10.7 | FRLO/ ... | EXISTING | INC ID |
| 001-011 | 104847 | 7.78 | HELOC/ ... | NEW | ACQ ID UTIL ID |
| 077-502 | 200321 | 11.2 | HELOC/ ... | EXISTING | INC ID UTIL ID FRLO ID |
| 003-041 | 113662 | 6.68 | HELOC/ ... | LINE LIN | UTIL ID INC IC |
| 562-134 | 104847 | 5.54 | FRLO | SUB-FRLO | FRLO ID |
| ⋮ | ⋮ | ⋮ | ⋮ | ⋮ | ⋮ |

FIG. 10

ACQUISITION MODEL $$N_i(t) = D_i \times S_i \times EXP(\beta_0 + (\beta_1 \times R_i) + (\beta_2 \times M_i) + (\beta_3 \times HPI_i) + (\beta_4 \times C_i) + (\beta_5 \times T_i) + V_i)$$

WHERE, $\beta_j$   IS THE CORRESPONDING MODEL PARAMETER FOR THE EXPLANATORY VARIABLES IN THE MODEL.

EXPLANATORY VARIABLES:

$N_i$   IS THE MODELED NUMBER OF NEW ORIGINATIONS FOR PRODUCT SEGMENT, $i$ $D_i$   IS THE TIME DEPENDENT DEMAND (TDD), A VARIABLE MEASURING THE SEASONAL VARIATION OF THE DEMAND FOR PRODUCT SEGMENT, $i$ $S_i$   IS THE CANNIBALIZATION FACTOR, A VARIABLE MEASURING THE CANNIBALIZATION IMPACT ON THE DEMAND FOR PRODUCT SEGMENT, $I$ $R_i$   DENOTES THE WEIGHTED AVERAGE OF INTEREST RATE CHARGED BY A FINANCIAL INSTITUTION FOR FIXED-RATE PRODUCT SEGMENT, $i$, OR THE INDEX RATE FOR VARIABLE-RATE PRODUCT SEGMENT, $i$ $M_i$   DENOTES THE AVERAGE MARGIN RATE CHARGED BY A FINANCIAL INSTITUTION FOR VARIABLE-RATE PRODUCT SEGMENT, $i$ $HPI_i$   DENOTES THE HOUSING PRICE INDEX OF THE MARKET WHERE PRODUCT SEGMENT, i, IS OFFERED $C_i$   DENOTES THE WEIGHTED AVERAGE OF COMPETITOR INDEX FOR PRODUCT SEGMENT, $i$ $T_i$   DENOTES A LONG-TERM TREASURY BILL RATE (I.E. 10 YEAR T-BILL) RELEVANT FOR PRODUCT SEGMENT, $i$ $V_i$   IS THE PROMOTIONAL LIFT VARIABLE FOR A PRODUCT SEGMENT, $i$

FIG. 11

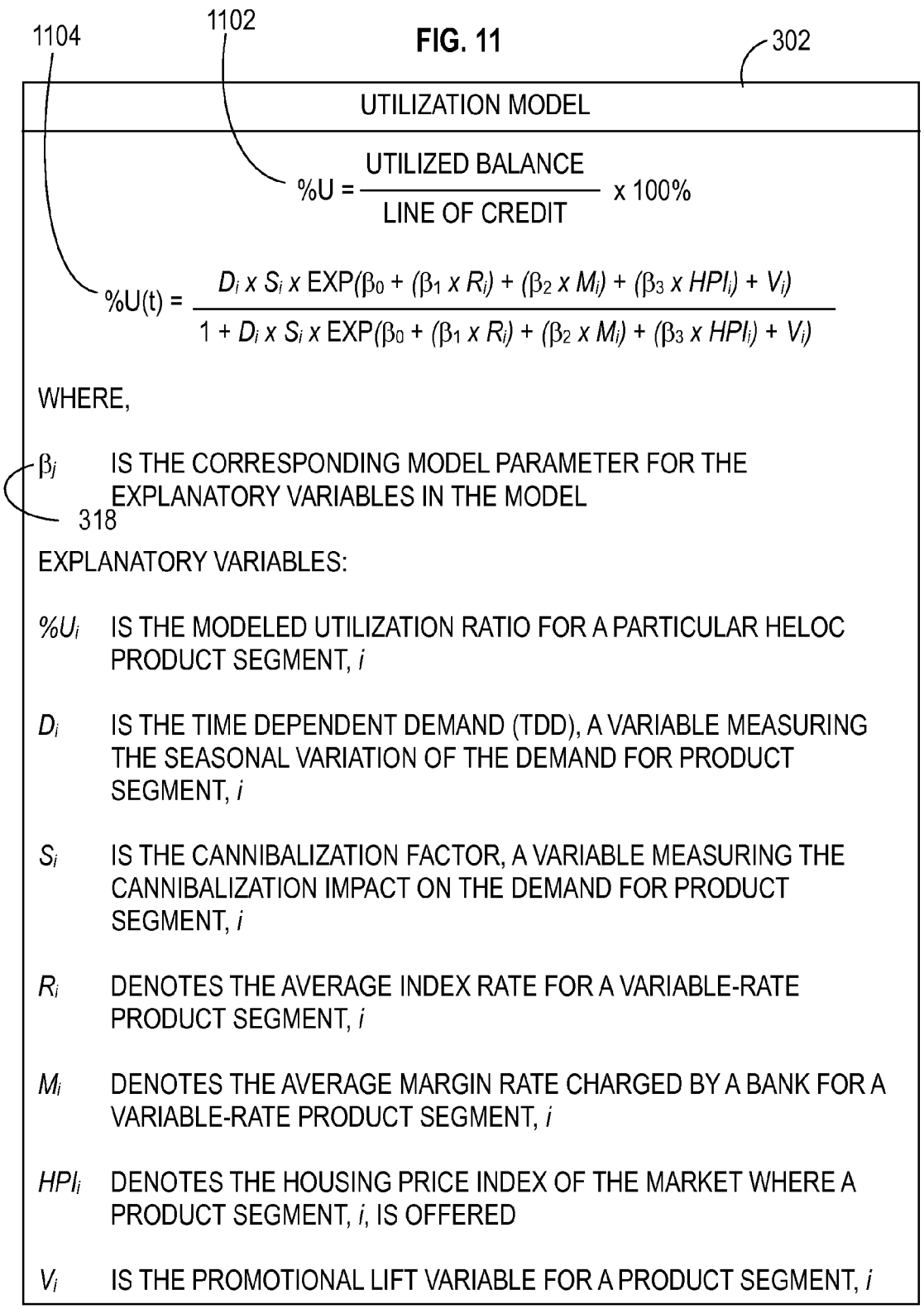

UTILIZATION MODEL $$\%U = \frac{\text{UTILIZED BALANCE}}{\text{LINE OF CREDIT}} \times 100\%$$

$$\%U(t) = \frac{D_i \times S_i \times EXP(\beta_0 + (\beta_1 \times R_i) + (\beta_2 \times M_i) + (\beta_3 \times HPI_i) + V_i)}{1 + D_i \times S_i \times EXP(\beta_0 + (\beta_1 \times R_i) + (\beta_2 \times M_i) + (\beta_3 \times HPI_i) + V_i)}$$

WHERE, $\beta_j$    IS THE CORRESPONDING MODEL PARAMETER FOR THE EXPLANATORY VARIABLES IN THE MODEL

EXPLANATORY VARIABLES:

$\%U_i$    IS THE MODELED UTILIZATION RATIO FOR A PARTICULAR HELOC PRODUCT SEGMENT, $i$ $D_i$    IS THE TIME DEPENDENT DEMAND (TDD), A VARIABLE MEASURING THE SEASONAL VARIATION OF THE DEMAND FOR PRODUCT SEGMENT, $i$ $S_i$    IS THE CANNIBALIZATION FACTOR, A VARIABLE MEASURING THE CANNIBALIZATION IMPACT ON THE DEMAND FOR PRODUCT SEGMENT, $i$ $R_i$    DENOTES THE AVERAGE INDEX RATE FOR A VARIABLE-RATE PRODUCT SEGMENT, $i$ $M_i$    DENOTES THE AVERAGE MARGIN RATE CHARGED BY A BANK FOR A VARIABLE-RATE PRODUCT SEGMENT, $i$ $HPI_i$    DENOTES THE HOUSING PRICE INDEX OF THE MARKET WHERE A PRODUCT SEGMENT, $i$, IS OFFERED $V_i$    IS THE PROMOTIONAL LIFT VARIABLE FOR A PRODUCT SEGMENT, $i$

FIG. 12

FIXED-RATE CONVERSION (FRLO) PROPENSITY MODEL

$$\%P = \frac{\text{NUMBER OF CONVERTED FRLO'S}}{\text{NUMBER OF HELOC'S AVAILABLE FOR CONVERSION}} \times 100\%$$

$$\%P(t) = \frac{D_i \times S_i \times \text{EXP}(\beta_0 + (\beta_1 \times R_i) + (\beta_2 \times PR_i) + (\beta_3 \times R_{HELi}) + V_i)}{1 + D_i \times S_i \times \text{EXP}(\beta_0 + (\beta_1 \times R_i) + (\beta_2 \times PR_i) + (\beta_3 \times R_{HELi}) + V_i)}$$

WHERE $\beta_j$    IS THE CORRESPONDING MODEL PARAMETER FOR THE EXPLANATORY VARIABLES IN THE MODEL

EXPLANATORY VARIABLES:

$\%P_i$    IS THE MODELED PROBABILITY OF FRLO CONVERSION FOR A HELOC PRODUCT SEGMENT, $i$ $D_i$    IS THE TIME DEPENDENT DEMAND (TDD), A VARIABLE MEASURING THE SEASONAL VARIATION OF THE DEMAND FOR PRODUCT SEGMENT, $i$ $S_i$    IS THE CANNIBALIZATION FACTOR, A VARIABLE MEASURING THE CANNIBALIZATION IMPACT ON THE DEMAND FOR PRODUCT SEGMENT, $i$ $R_i$    DENOTES THE AVERAGE INTEREST RATE CHARGED BY A BANK FOR AN FRLO PRODUCT SEGMENT, $i$ $PR_i$    DENOTES THE AVERAGE PRIME RATE FOR A VARIABLE-RATE PRODUCT SEGMENT, $i$ $R_{HELi}$    DENOTES THE AVERAGE INTEREST RATE CHARGED BY A BANK FOR A RELATED HEL PRODUCT SEGMENT, $i$ $V_i$    IS THE PROMOTIONAL LIFT VARIABLE FOR A PRODUCT SEGMENT, $i$

FIG. 13

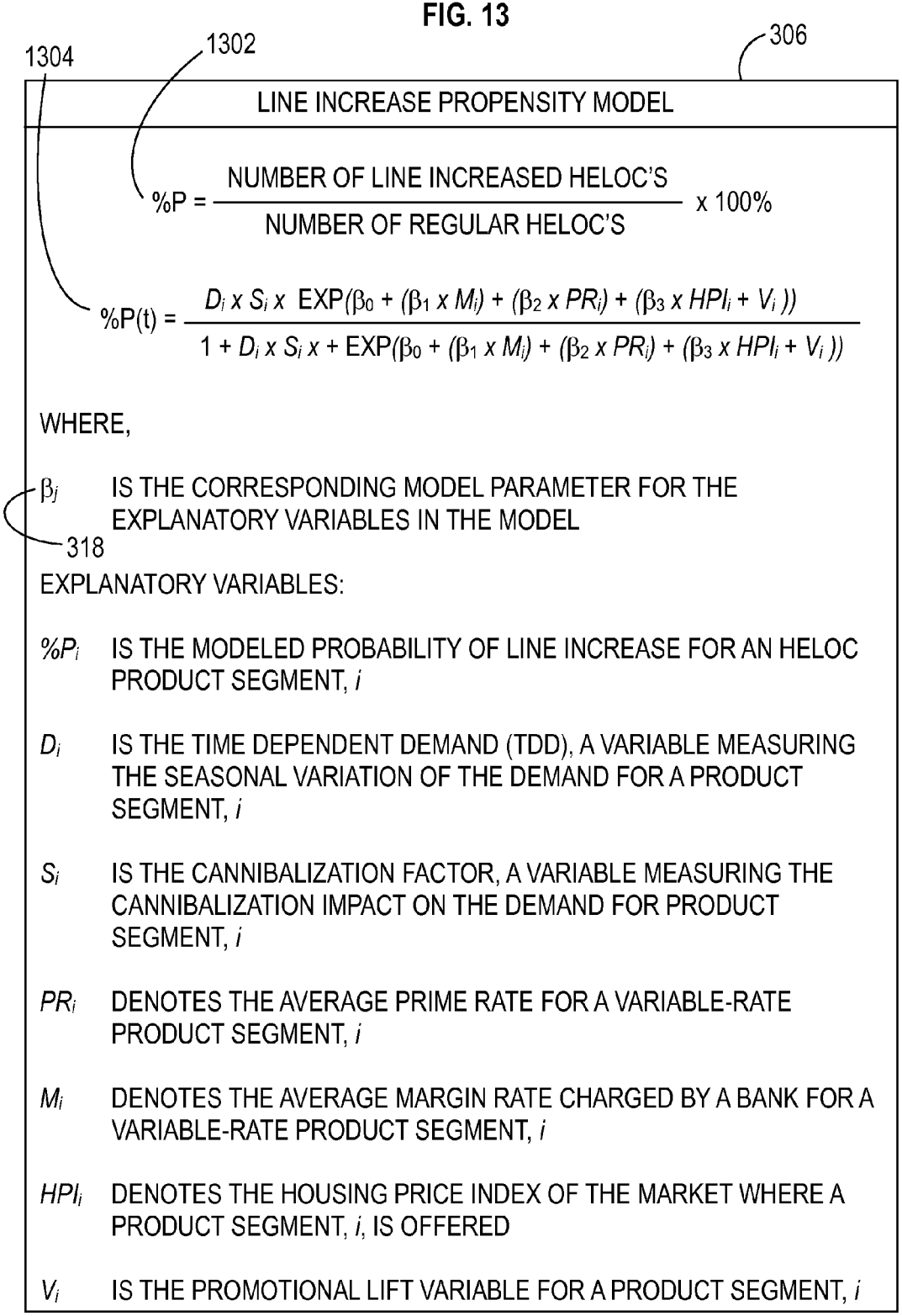

LINE INCREASE PROPENSITY MODEL

$$\%P = \frac{\text{NUMBER OF LINE INCREASED HELOC'S}}{\text{NUMBER OF REGULAR HELOC'S}} \times 100\%$$

$$\%P(t) = \frac{D_i \times S_i \times \text{EXP}(\beta_0 + (\beta_1 \times M_i) + (\beta_2 \times PR_i) + (\beta_3 \times HPI_i + V_i))}{1 + D_i \times S_i \times + \text{EXP}(\beta_0 + (\beta_1 \times M_i) + (\beta_2 \times PR_i) + (\beta_3 \times HPI_i + V_i))}$$

WHERE, $\beta_j$    IS THE CORRESPONDING MODEL PARAMETER FOR THE EXPLANATORY VARIABLES IN THE MODEL

EXPLANATORY VARIABLES:

$\%P_i$    IS THE MODELED PROBABILITY OF LINE INCREASE FOR AN HELOC PRODUCT SEGMENT, $i$ $D_i$    IS THE TIME DEPENDENT DEMAND (TDD), A VARIABLE MEASURING THE SEASONAL VARIATION OF THE DEMAND FOR A PRODUCT SEGMENT, $i$ $S_i$    IS THE CANNIBALIZATION FACTOR, A VARIABLE MEASURING THE CANNIBALIZATION IMPACT ON THE DEMAND FOR PRODUCT SEGMENT, $i$ $PR_i$    DENOTES THE AVERAGE PRIME RATE FOR A VARIABLE-RATE PRODUCT SEGMENT, $i$ $M_i$    DENOTES THE AVERAGE MARGIN RATE CHARGED BY A BANK FOR A VARIABLE-RATE PRODUCT SEGMENT, $i$ $HPI_i$    DENOTES THE HOUSING PRICE INDEX OF THE MARKET WHERE A PRODUCT SEGMENT, $i$, IS OFFERED $V_i$    IS THE PROMOTIONAL LIFT VARIABLE FOR A PRODUCT SEGMENT, $i$

FIG. 14

AVERAGE LOAN LIFE MODEL $$G_i(t) = D_i \times S_i \times EXP(\beta_0 + (\beta_1 \times R_i) + (\beta_2 \times M_i) + (\beta_3 \times HPI_i) + (\beta_4 \times T_i))$$

WHERE, $\beta_j$    IS THE CORRESPONDING MODEL PARAMETER FOR THE EXPLANATORY VARIABLES IN THE MODEL

EXPLANATORY VARIABLES:

$G_i$    IS THE MODELED AVERAGE AGE FOR A PRODUCT SEGMENT, $i$ $D_i$    IS THE TIME DEPENDENT DEMAND (TDD), A VARIABLE MEASURING THE SEASONAL VARIATION OF THE DEMAND FOR A PRODUCT SEGMENT, $i$ $S_i$    IS THE CANNIBALIZATION FACTOR, A VARIABLE MEASURING THE CANNIBALIZATION IMPACT ON THE DEMAND FOR PRODUCT SEGMENT, $i$ $R_i$    DENOTES THE WEIGHTED AVERAGE OF INTEREST RATE CHARGED BY A BANK FOR A -RATE PRODUCT SEGMENT, $i$, OR THE INDEX RATE FOR A VARIABLE-RATE PRODUCT SEGMENT, $i$ $M_i$    DENOTES THE AVERAGE MARGIN RATE CHARGED BY A BANK FOR A VARIABLE-RATE PRODUCT SEGMENT, $i$ $HPI_i$    DENOTES THE HOUSING PRICE INDEX OF THE MARKET WHERE A PRODUCT SEGMENT, $i$, IS OFFERED $T_i$    DENOTES A LONG-TERM TREASURY BILL RATE (I.E. 10 YEAR T-BILL) RELEVANT FOR A PRODUCT SEGMENT, $i$

FIG. 16

PRODUCT SEGMENT DESCRIPTION

PRODUCT SEGMENT ID: 104847
DEMAND TYPE: HELOC
MARKET: CALIFORNIA
LIEN(S): 2ND LIEN
FICO TIERS: 720-739
CLTV RANGE: 0-65%
BALANCE TIER: $250,000-$499,999
CHANNEL: FINANCIAL INSTITUTION
TERM: N/A

MODEL PARAMETERS—ACQUISITION MODEL

| MODEL PARAMETER | EXPLANATORY VARIABLES | VALUE OF $\beta$ | SD OF $\beta_j$ | VAR OF $\beta_j$ |
|---|---|---|---|---|
| $\beta_0$ | BASE DEMAND | 7.25370 | | |
| $\beta_1$ | INDEX RATE, $R_i$ | -0.58600 | 0.21641 | 0.046835 |
| $\beta_2$ | MARGIN, $M_i$ | -0.42350 | 0.30357 | 0.0921557 |
| $\beta_3$ | HOUSING PRICE INDEX, $HPI_i$ | 0.00092 | 0.00225 | 0.0000050425 |
| $\beta_4$ | COMPETITOR INDEX, $C_i$ | -0.15835 | 0.13224 | 0.017486462 |
| $\beta_5$ | T-BILL RATE, $T_i$ | 0.14150 | 0.22966 | 0.052742 |

GOODNESS OF FIT, $R^2$ = 0.48

FIG. 17

| CUSTOMER BEHAVIOR | DEMAND MODEL | PERFORMANCE INDICATOR |
|---|---|---|
| ORIGINATION | ACQUISITION | ORIGINATION VOLUMES |
| UTILIZATION | UTILIZATION | UTILIZATION RATIOS |
| FRLO CONVERSION | FRLO PROPENSITY | PROPENSITY FOR FRLO |
| LINE INCREASE | LINE INCREASE | LINE INCREASE PROBABILIY |
| LOAN LIFE ADJUSTMENT | AVERAGE LOAN LIFE | PAY-OFF |

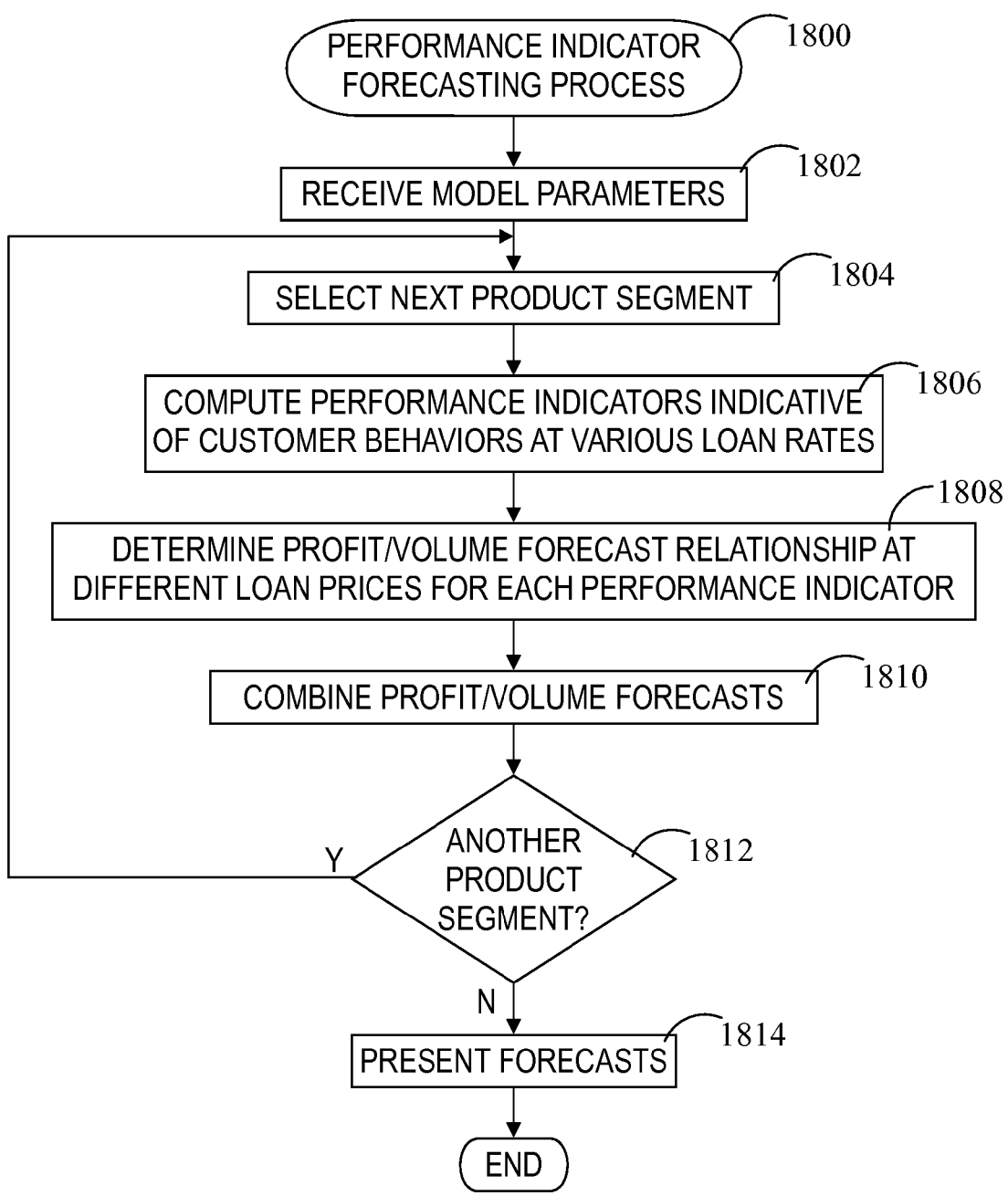

FIG. 19

| PRODUCT SEGMENT DESCRIPTION | |
|---|---|
| Product ID | 200321 |
| State | California |
| Liens | 2ND LIEN and 3RD LIEN |
| FICO tiers | 740+ |
| CLTV range | 0-65% |
| Balance tiers | $20,000-$49,999, and $50,000-$99,999 |
| Channel | BFS FINANCIAL CENTER |
| TERM | 16-20 YRS |

| PROFIT AND VOLUME FORECAST AT DIFFERENT RATES | | |
|---|---|---|
| RATE | PROFIT (NPV) | VOLUME |
| 8.2 | $ 4,783 | $ 426,602 |
| 8.5 | $ 5,956 | $ 407,342 |
| 9.2 | $ 7,013 | $ 388,781 |
| 9.7 | $ 7,960 | $ 371,065 |
| 10.2 | $ 8,807 | $ 354,157 |
| 10.7(CURRENT) | $ 9,560 | $ 338,109 |
| 11.2 | $ 10,227 | $ 322,616 |
| 11.7 | $ 10,812 | $ 307,915 |
| 12.2 | $ 11,323 | $ 293,884 |
| 12.7 | $ 11,765 | $ 280,493 |
| 13.2 | $ 12,143 | $ 267,712 |
| 13.7 | $ 12,463 | $ 255,513 |

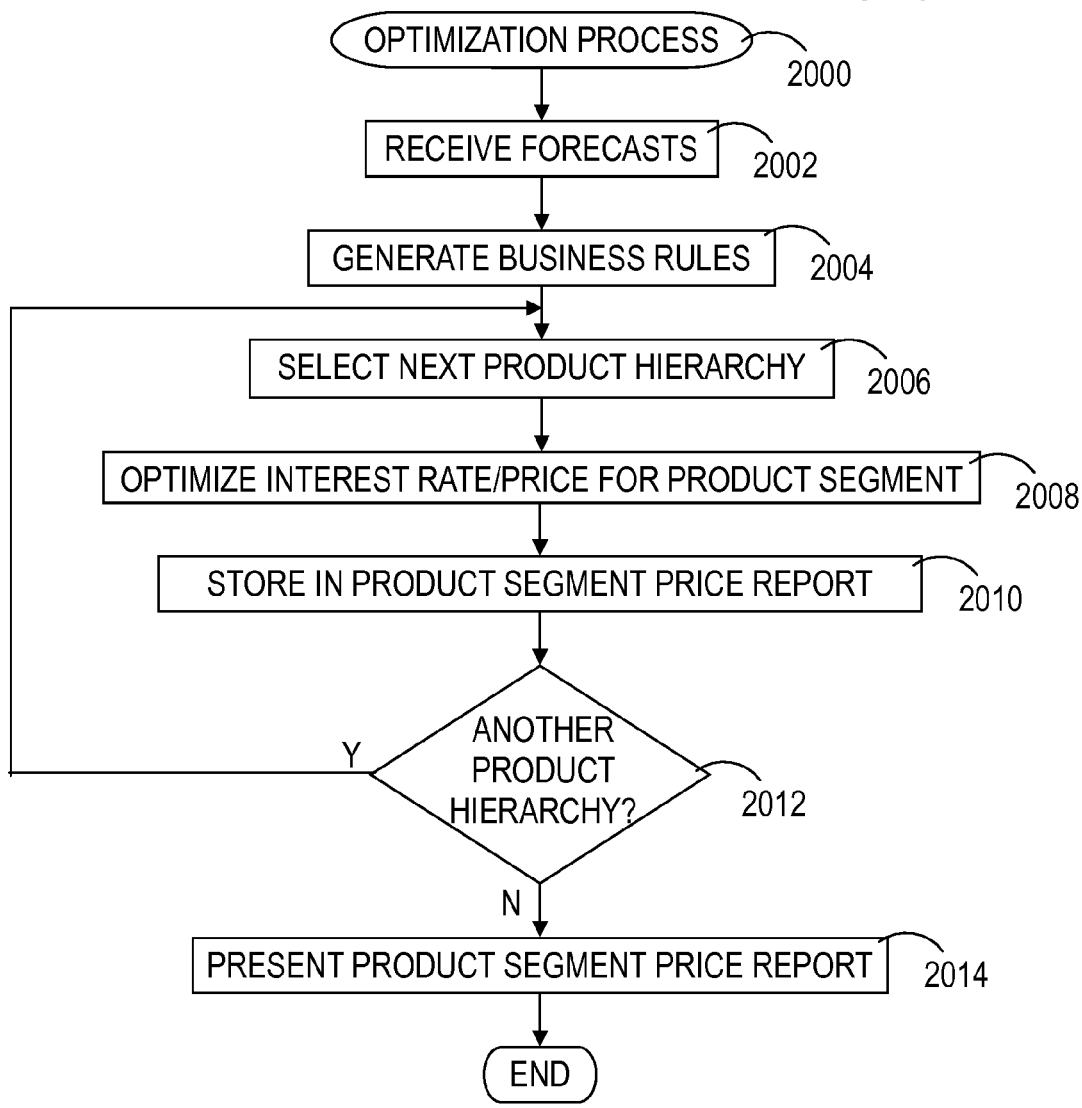

SYSTEM AND COMPUTER PROGRAM FOR MODELING AND PRICING LOAN PRODUCTS

TECHNICAL FIELD OF THE INVENTION

The present invention relates to the field of demand modeling. More specifically, the present invention relates to demand modeling for estimating the impact of interest rate on loan products.

BACKGROUND OF THE INVENTION

As is well known, a loan is an advance of money from a lender to a borrower over a period of time. The borrower is obliged to repay the loan either at intervals during or at the end of the loan period together with interest. A home equity loan product, such as a home equity loan or a home equity line of credit, is an amount of money a homeowner can borrow against his or her home equity. A home equity loan (HEL) provides a borrower with a lump sum of money and carries a fixed rate. A home equity line of credit (HELOC) differs from a conventional HEL in that the borrower is not advanced the entire sum up front, but uses the line of credit to borrow sums that total no more than a certain amount. A borrower with a HELOC pays interest only on the amount withdrawn, or borrowed. However, the interest rate on a HELOC is variable based on an index such as prime rate. This means that the interest rate can, and typically does, change over time.

Record numbers of homeowners have been turning to home equity loan products as a source of ready cash to help finance major home repairs, medical bills, or college educations. Indeed, analysts believe that an annual two-digit increase in home equity lending in recent years may reflect a fundamental shift in consumer borrowing habits.

HELOC loans have become especially popular, in part because interest paid is often deductible under federal and many state income tax laws. This effectively reduces the cost of borrowing funds. Another reason for the popularity of HELOCs is flexibility not found in most other loans—both in terms of borrowing "on demand" and repaying on a schedule determined by the borrower. Furthermore, HELOC loans' popularity growth may also stem from their having a better image than a "second mortgage," a term which can more directly imply an undesirable level of debt.

In order to understand their home equity business and correctly set interest rates, i.e., price, for their HELs and HELOCs, financial institutions need to understand the effect of interest rate changes on their loan portfolio performance. That is, rate changes can elicit a number of customer behaviors, or responses. These customer behaviors include, for example, applying for a new HEL or HELOC, referred to as an origination behavior, and/or utilizing more balance of their existing account, referred to as a utilization behavior. Other customer behaviors responsive to rate changes include increasing their line of credit, referred to as a line increase behavior, and extending or shortening the life of their existing loan, referred to as a loan life adjustment behavior. A recent development in home equity loan products is known as a fixed-rate loan option (FRLO). An FRLO allows a borrower to take fixed-rate loans from his HELOC. Thus, a borrower can take advantage of variable interest rates while they are low, and convert to fixed rates when they start to climb. This conversion to an FRLO is referred to as a fixed-rate conversion behavior.

If a financial institution lowers the interest rate, i.e. price, on a particular HELOC product segment, some borrowers may apply for a new loan, others may utilize more balance of their existing HELOC, some may take an FRLO on top of their HELOC, some borrowers may increase their lines of credit, and still others may extend the life of their existing loans. Consequently, changes in interest rate, i.e., the price of a loan, can affect total loan volume through all five of these customer behaviors.

An understanding of the effect of interest rate changes on loan portfolio performance, calls for careful analysis of the potential channels, or customer behaviors, that can be influenced by rate changes. A financial institution typically utilizes a simple, static statistic model to estimate the interest rate impact on origination volume, i.e., origination behavior. The financial institution may then use ad hoc data averaging to obtain information regarding the other four types of customer behaviors. Unfortunately, the procedure for forming the estimates is time and labor intensive, and ad hoc data averaging can lead to estimation inaccuracies.

Consequently, what is needed is an automated, dynamic demand modeling system with which a financial institution can accurately and concurrently model multiple types of customer behaviors to gauge an impact that rate change has on loan products, such as home equity loans and home equity lines of credit.

SUMMARY OF THE INVENTION

Accordingly, it is an advantage of the present invention that a demand modeling system for home equity loans and home equity lines of credit is provided.

Another advantage of the present invention is that a demand modeling system is provided that models changes in customer behaviors as a function of changes in loan rates.

It is another advantage of the present invention that a demand modeling system is provided that quantifies relationships between loan volumes and rates and utilizes those relationships to forecast loan volumes at various rates.

Yet another advantage of the present invention is that the demand modeling system can readily model multiple customer behaviors in a time and labor efficient manner.

The above and other advantages of the present invention are carried out in one form by a computer program residing in memory and executable by a processor, the computer program being configured to provide a price for a product segment of a loan product offered by a financial institution. The computer program instructs the processor to perform operations comprising receiving transaction records for loans taken at various prices for the loan product and computing performance indicators indicative of customer behaviors observed in the transaction records using independent demand models. Relationships are determined between the performance indicators and the various prices and the relationships are utilized to select the price for the product segment for implementation by the financial institution.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 10 shows a table representing the mathematical operations of an acquisition model implemented within a model engine implemented within the computing system of FIG. 1;

FIG. 11 shows a table representing the mathematical operations of a utilization model implemented within the model engine;

FIG. 12 shows a table representing the mathematical operations of a fixed-rate conversion (FRLO) propensity model implemented within model engine;

FIG. 13 shows a table representing the mathematical operations of a line increase propensity model implemented within the modeling engine;

FIG. 14 shows a table representing the mathematical operations of an average loan life model implemented within the model engine;

FIG. 16 shows a table representing a portion of a parameter section of a parameter/forecast output record resulting from an iteration of the modeling process;

FIG. 17 shows a table representing customer behaviors that are modeled in accordance with an embodiment of the present invention;

FIG. 18 shows a flowchart of a performance indicator forecasting process performed by a performance indicator forecaster of the computing system of FIG. 1;

FIG. 19 shows a table representing exemplary forecasting results for a product segment resulting from the execution of the performance indicator forecasting process;

FIG. 20 shows a flowchart representing an optimization process performed by a price optimizer of computing system of FIG. 1; and FIG. 21 shows a table of a portion of a product segment price report that may be presented to a user following execution of the optimization process.

DETAILED DESCRIPTION OF THE PREFERRED EMBODIMENTS

Figure 1:
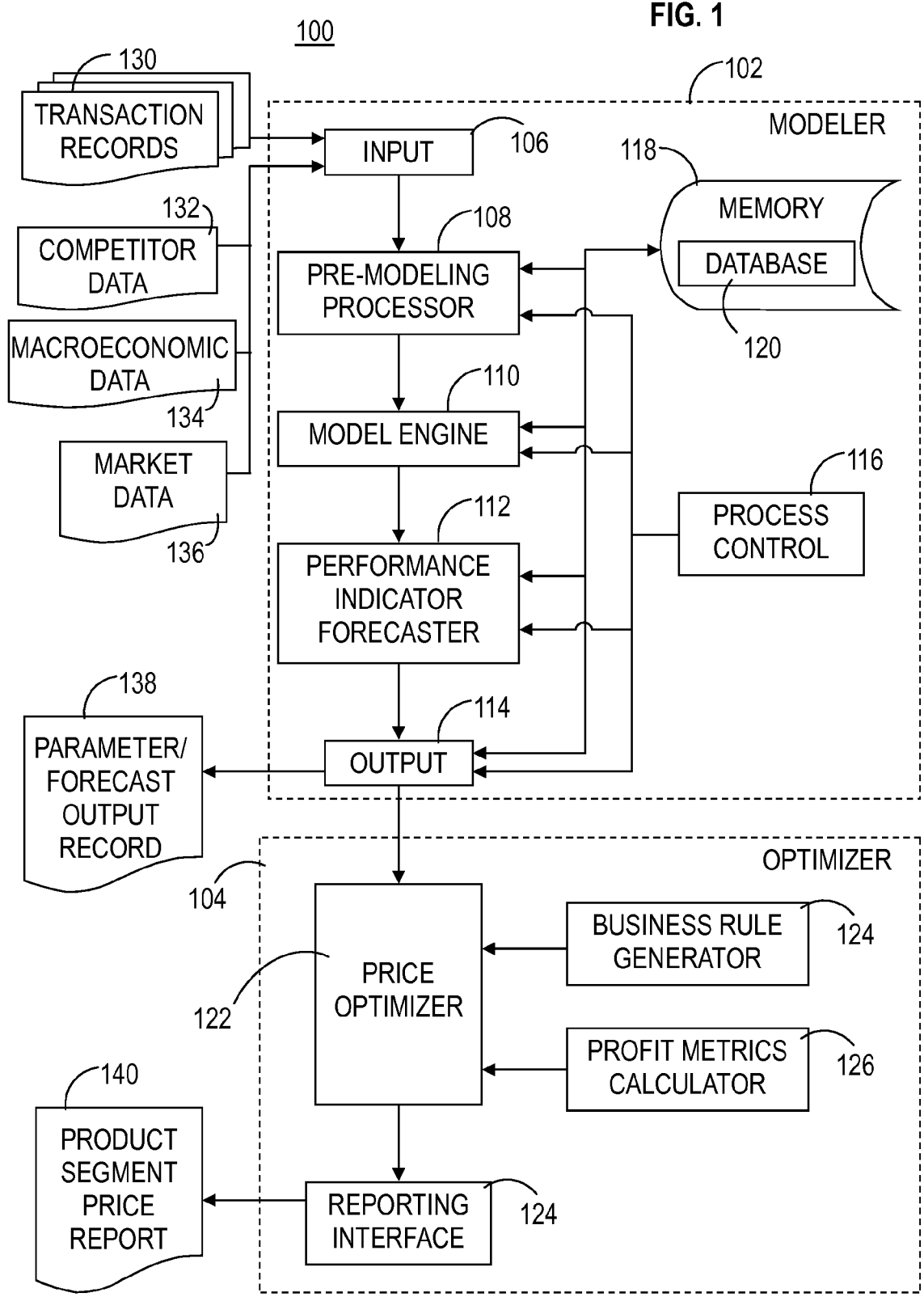
FIG. 1 shows a block diagram of an exemplary computing system within which the present invention may be practiced.

The present invention provides a computer-implemented dynamic demand modeling system and computer program for estimating rate elasticity for loan products offered by a financial institution. In particular, the loan products include those known as a home equity loan (HEL) and a home equity line of credit (HELOC). However, the present invention may be adapted for use with other home equity loan products, or other closed end loans or credit loans that may exhibit fixed or variable rates.

The demand modeling system includes multiple independent demand models that together provide a complete evaluation mechanism for price/rate impact on net asset value of a home equity lending business at a financial institution. It should be noted that the terms "price," "rate," and "interest rate" are used synonymously herein. Each of the independent models has its own functional form and data requirements. Therefore, the user can run all or selected ones of the independent demand models in parallel or sequentially. Moreover, if a new home equity loan product is developed, the demand modeling system can accordingly evolve to include a new modeling component specific to this new home equity loan product.

In the following discussion relating to FIGS. 1-21, each Figure's reference numerals are correlated with its respective Figure number, i.e., FIG. 1 has reference numerals in the 100's, FIG. 2 has reference numerals in the 200's, and so forth.

FIG. 1

FIG. 1 shows a block diagram of an exemplary computing system 100 within which the present invention may be practiced. Environment 100 generally includes a processor section, referred to herein as a modeler section 102 and a processor section, referred to herein as an optimizer section 104. Modeler section 102 includes an input 106, a pre-modeling processor 108 in communication with input 106, and a model engine 110 in communication with pre-modeling processor 108. A performance indicator forecaster 112 is in communication with model engine 110 and an output is 114 in communication with performance indicator forecaster 112.

A process control device 116 in communication with each of pre-modeling processor 108, model engine 110, performance indicator forecaster 112, and output 114 enables a user to select demand models (discussed below) of model engine 110, change default model engine settings, and to monitor the processes. A memory 118 is in communication with each of pre-modeling processor 108, model engine 110, performance indicator forecaster 112, and output 114. Memory 118 provides an internal database 120 to store product segment definitions, historical transaction data, macroeconomic data, and so forth (discussed below). Optimizer section 104 includes a price optimizer 122, a business rule generator 124, a profit metrics calculator 126, and a reporting interface 128 are in communication with price optimizer 122.

Input section 106 represents any manner of input elements (i.e., a keyboard, mouse, automated data interface, and so forth) through which historical data, such as transaction records 130, competitor data 132, macroeconomic data 134, housing market data 136, and the like may be loaded into computing system 100. Memory 118 represents any manner of computer-readable media, including both primary memory (e.g., semiconductor devices with higher data transfer rates) and secondary memory (e.g., semiconductor, magnetic, and/or optical storage devices with lower data transfer rates) for retaining database 120. In turn, database 120 may include any or all of the input historical data, i.e., transaction records 130, competitor data 132, macroeconomic data 134, housing market data 136, and the like.

As will be discussed in detail in connection with the ensuing figures, pre-modeling processor 108 executes program code to identify and organize the historical data to make it functional for model engine 110 to process. Model engine 110 executes program code to tune each of five independent demand models to the historical data and to compute model parameters. Performance indicator forecaster 112 executes program code to receive the model parameters from model engine 110 and to compute various performance indicators such as, origination volume, utilization ratio, fixed rate loan option (FRLO) conversion probability, line increase probability, and average loan age, indicative of customer behavior as a function of changes in rates within a product segment. Forecaster 112 can determine relationships between the performance indicators and various rates within a product segment. These relationships are subsequently utilized to select prices, i.e., interest rates, for various product segments that can be implemented by a financial institution.

Output 114 represents any manner of output elements (i.e., monitors, printers, etc.) from which the modeling and forecast results in, for example, a parameter/forecast output record 138, can be exported to external storage (not shown) and/or to a display device (not shown), and/or to a printer from which a user can access parameter/forecast output record 138. In addition, or alternatively, parameter/forecast output record 138 may be exported from output 114 to price optimizer 122 of optimizer section 104. Price optimizer 122 executes program code to read parameter/forecast output record 138 and combine it with profit metrics to generate a set of optimal prices for a home equity portfolio subject to certain business constraints. A recommended product segment price report 140 can then be presented or displayed through reporting interface 128, and/or report 140 can be exported to an external storage device (not shown).

In accordance with the present invention, modeler section 102 and optimizer section 104 are components of a computer system. As such, each of pre-modeling processor 108, model engine 110, and performance indicator forecaster 112 may be implemented as a computer program, hardware, or a combination of both computer program and hardware. For example, pre-modeling processor 108 is characterized herein as a processor that executes program code in the form of a transaction record classification process, discussed in connection with FIG. 4. Model engine 110 is characterized herein as a processor that executes program code in the form of a modeling process, discussed in connection with FIG. 15. Performance indicator forecaster 112 is characterized herein as a processor that executes program code in the form of a performance indicator forecasting process, discussed in connection with FIG. 18. Finally, price optimizer 122 is characterized herein as a processor that executes program code in the form of a optimization process, discussed in connection with FIG. 20.

Nothing prevents the components of modeler section 102 and optimizer section 104 from including numerous subsections that may or may not be located near each other. Thus, computing system 100 may be provided by any of a vast array of general or special purpose computers and/or computer networks. In addition, the components of modeler section 102 and optimizer section 104 may be implemented as a computer program, hardware, or a combination of both computer program and hardware.

FIG. 2

Figure 2:
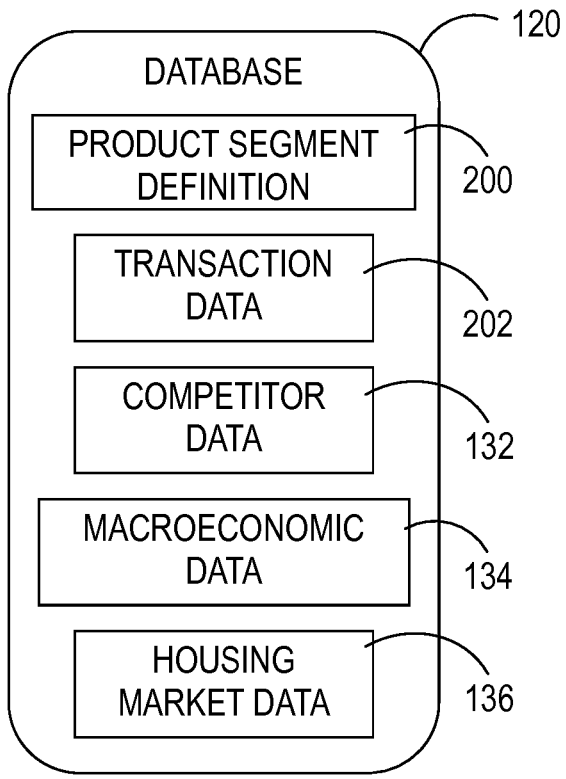
FIG. 2 shows a block diagram representing a database that may be stored in memory of the computing system of FIG. 1.

FIG. 2 shows a block diagram representing database 120 that may be stored in memory 118 of computing system 100. Database 120 includes a collection of records or data. In this example, database 120 contains the input competitor data 132, macroeconomic data 134, and housing market data 136. Additionally, database 120 contains a product segment definition record 200 and a transaction data record 202.

A financial institution acts as an agent that provides financial services for its clients. Common types of financial institutions include banks, building societies, credit unions, stock brokerages, asset management firms, and similar businesses.

The function of a financial institution is to provide a service as an intermediary between the capital and the debt markets. Thus, a financial institution is responsible for transferring funds to those in need of funds.

In the context of the present invention, a financial institution may offer a home equity loan product or products. The home equity loan products may include fixed-rate home equity loans (HELs) or variable-rate home equity lines of credit (HELOCs). Typically, the financial institution will offer various "products" or "product segments" within their loan product. It should be understood that the terms "product" and "product segment" may be utilized synonymously herein. Product segments can be differentiated by different product attributes, such as loan type, channel, market group, lien position, combined loan to value (CLTV), balance tier, term range, Fair Isaac Corporation (FICO) credit score range, and so forth. Thus, a unique combination of these attributes forms a "product" or "product segment." Product segment definition record 200 includes a definition of each of the product segments of a loan product being offered by a financial institution.

Model engine 110 is a mathematical solver that looks at rate changes in historical transactional data and models the changes in performance indicators (discussed below) as a function of changes in rates for each product segment. Transactional data is input into modeler section 102 as transaction records 130. These transaction records 130 include historical data from a prior time period, such as the two previous years, characterizing customer behaviors observed in these transaction records 130. In accordance with the present invention, these customer behaviors include an origination behavior, a utilization behavior, a fixed-rate conversion behavior, a line increase behavior, and a loan life adjustment behavior. Thus, transaction records 130 are those customer initiated activities that include applying for a new loan (origination behavior), converting to a fixed-rate loan (fixed-rate conversion behavior), initiating a line increase (line increase behavior, and adjusting the life of an existing loan (loan life adjustment behavior). In addition, transaction records 130 can include passive periodic snapshots that reflect changes in utilization of funds from an HELOC (utilization behavior). These transaction records 130 are classified (discussed below) and stored as transaction data record 202 in database 120. A transaction record classification process executed by pre-modeling processor 108 is provided in connection with FIGS. 4-8.

FIG. 3

Figure 3:
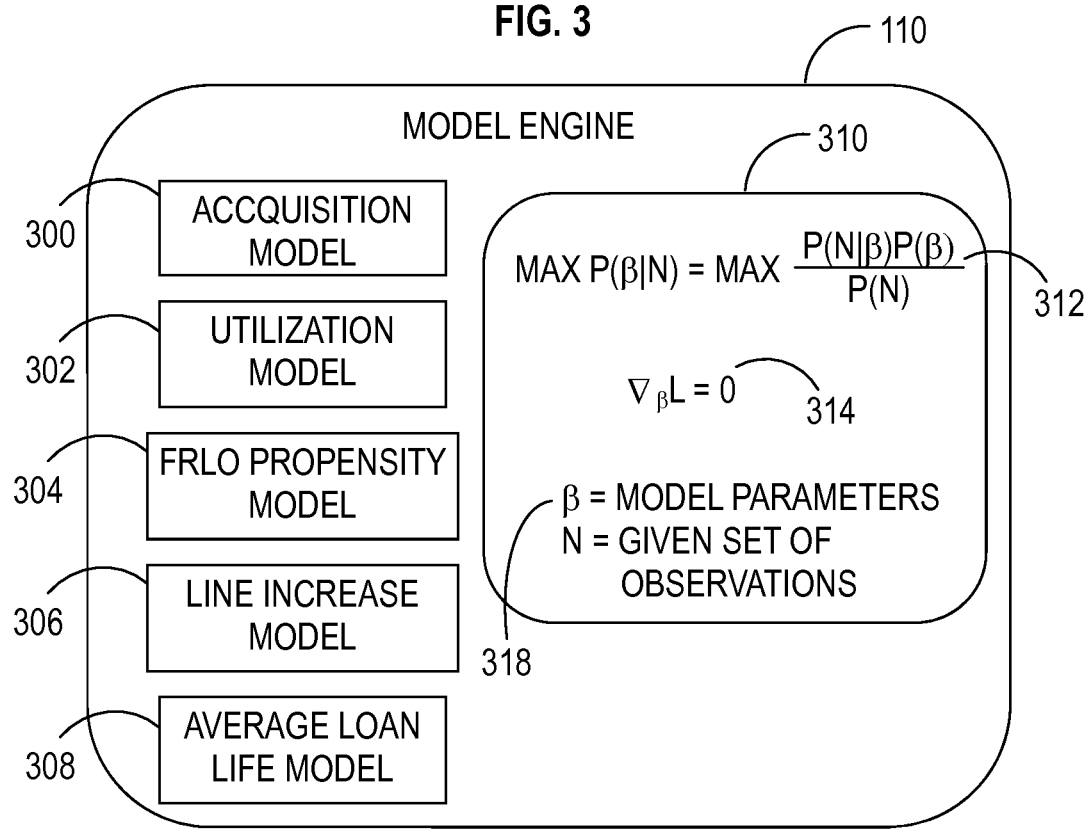
FIG. 3 shows a block diagram representing a model engine including multiple independent demand models implemented within the computing system of FIG. 1.

FIG. 3 shows a block diagram representing model engine 110 including multiple independent demand models implemented within computing system 100. The demand models include an acquisition model 300, a utilization model 302, a fixed-rate loan option (FRLO) propensity model 304, a line increase model 306, and an average loan life model 308.

Acquisition model 300 captures the relationship between a quantity of loan originations and interest rates to predict the variation of loan originations in response to loan interest rates. Utilization model 302 explicitly quantifies the relationship between utilization ratio of HELOCs and loan interest rates and thus can be used to predict the amount expected to be utilized by borrowers for HELOC accounts. FRLO propensity model 304 identifies the relationship between FRLO conversion probability and interest rate changes and thus can be used to predict the probability of FRLO conversion occurrence. Similarly, line increase model 306 identifies the relationship between HELOC line increase probability and interest rate changes, and thus predicts the likelihood that borrowers will increase their lines of credit if loan prices change. Average loan life model 308 predicts the average age of closed loans at various loan prices.

Model engine 110 containing the five econometric demand models, reads data from database 120, and mathematically solves for the values of model parameters, β, for all or selected ones of acquisition model 300, utilization model 302, fixed-rate loan option (FRLO) propensity model 304, line increase model 306, and average loan life model 308.

An internal architecture component 310 represents a process of obtaining model parameters, β, 318. Model engine 110 may obtain the values of the model parameters 318 through a Bayesian estimation technique. Bayesian estimation is related to the method of maximum a posteriori (MAP) estimation which maximizes the posterior probability density based on a prior probability estimate of the model parameter. Thus, model engine 110 implements a prior probability estimate represented in FIG. 3, by an objective function 312, where β is a vector of model parameters 318 and N is a given set of observations. Model engine 110 can use Poisson assumption for the observation probability distribution, $P(N|\beta)$, and can use a Gaussian distribution for the prior $P(\beta)$. Since Poisson distribution is exponential, the logarithm of the distribution is differentiable and monotonic with respect to the vector of model parameters, β, 318.

Model engine 110 computes the model parameter vector, Λ, 318 that maximizes the log likelihood, L, of the posteriori term by setting a gradient 314 and solving the equation represented as objective function 312 using an iterative technique, such as a Newton-Raphson method. Further details of a modeling process executed by model engine 110 are provided below in connection with FIG. 15. It should be understood, however, that the numerical methods used by model engine 110 to solve for model parameters 318 may take various forms and modifications known to those skilled in the art.

FIG. 4

Figure 4:
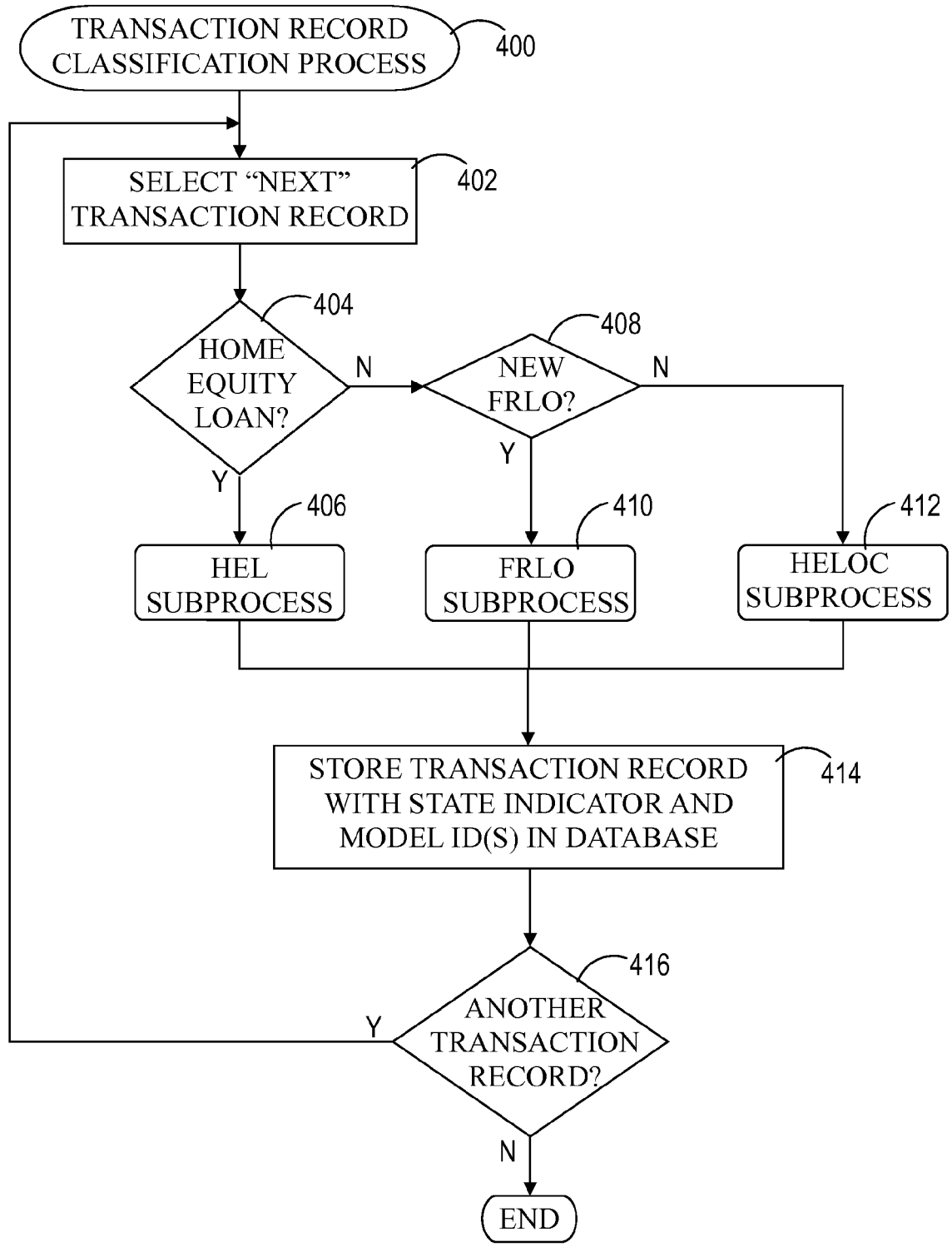
FIG. 4 shows a flowchart of a transaction record classification process.

FIG. 4 shows a flowchart of a transaction record classification process 400 executed by pre-modeling processor 108. In general, transaction record classification process 400 classifies each of transaction records 130 into three loan categories and then assigns each of transaction records 130 a status or "state" indicator. These status indicators include, for example, new, existing, closed, line increase, and subsequent FRLO, and will be discussed in greater detail below. Each of transaction records 130 is additionally assigned one or more model identifiers related to the acquisition model 300, utilization model 302, FRLO propensity model 304, line increase model 306, and/or average loan life model 308.

Transaction record classification process 400 begins with a task 402. At task 402, a "next" one of transaction records 130 is selected from those input into modeler section 102 via input 106. Of course, it should be understood that during a first iteration of task 402, the "next" transaction record 130 is a first transaction record 130.

In response to task 402, classification process 400 continues with a query task 404. Classification process 400 first determines whether transaction record 130 is related to a fixed-rate home equity loan (HEL) or to a variable-rate home equity line of credit (HELOC). Accordingly, query task 404 determines whether the selected transaction record 130 is related to a HEL. When transaction record 130 is related to a HEL, classification process 400 proceeds to a HEL subprocess 406. HEL subprocess 406 will be described in connection with FIG. 5.

When transaction record 130 is not related to an HEL, that is, when transaction record 130 is related to an HELOC, classification process 400 proceeds to a query task 408. At query task 408, a determination is made as to whether transaction record 130 is a newly converted fixed rate line option (FRLO) or whether transaction record 130 is related to a pure HELOC. In accordance with an embodiment, a newly converted FRLO is an FRLO that was originated within, for example, the same month of origination of the HELOC. Therefore, transaction record 130 related to a newly converted FRLO is in nature a fixed rate loan and is treated differently from a variable-rate HELOC by model engine 110.

When query task 408 determines that transaction record 130 is related to a newly converted FRLO, classification process 400 proceeds to a FRLO subprocess 410. FRLO subprocess 410 will be described in connection with FIG. 6. However, when query task 408 determines that transaction record 130 is not related to a newly converted FRLO, i.e., it's a "pure" HELOC, classification process 400 proceeds to an HELOC subprocess 412. HELOC subprocess 412 will be described in connection with FIG. 7. Subsequent tasks in the flowchart of FIG. 4 shall be discussed below, following a discussion of FIGS. 5-7.

FIG. 5

Figure 5:
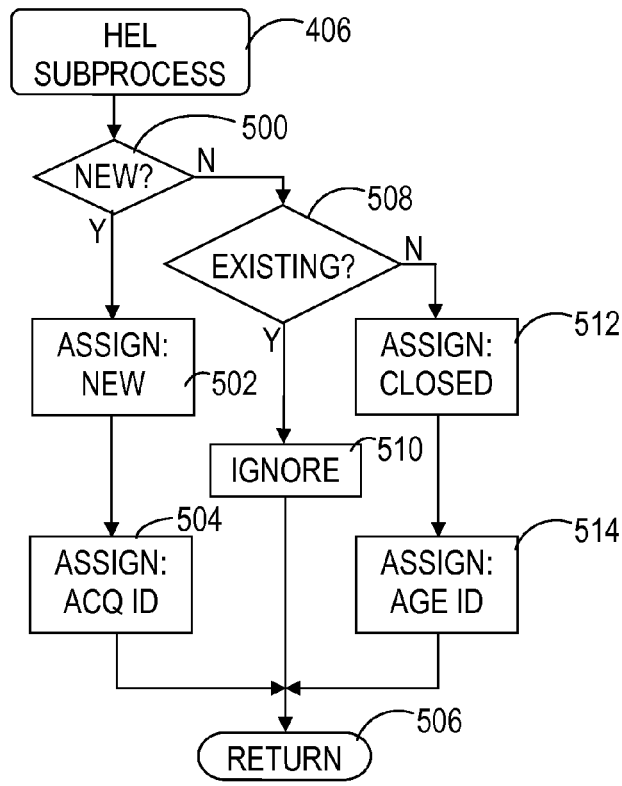
FIG. 5 shows a flowchart of a home equity loan subprocess of the transaction record classification process.

FIG. 5 shows a flowchart of home equity loan subprocess 406 of transaction record classification process 400. Home equity loan subprocess 406 is executed when query task 404 of transaction record classification process 400 determines that the currently selected "next" transaction record 130 is related to a home equity loan (HEL). The function of subprocess 406 is to classify transaction record 130 into one of three states: new, existing, or closed, and in response assign that transaction record 130 with an appropriate model identifier.

Accordingly, HEL subprocess 406 begins with a query task 500. At query task 500, a determination is made as to whether the currently selected transaction record 130 is related to a new HEL. When transaction record 130 is related to a new HEL, subprocess 406 proceeds to a task 502.

At task 502, transaction record 130 is assigned a state indicator of "NEW" identifying transaction record 130 as being related to a newly originated HEL. Following task 502, subprocess 406 proceeds to a task 504.

At task 504, transaction record 130 is assigned a model identifier of "ACQ ID" so that the relevant data of transaction record 130 can be subsequently used as input data for acquisition model 300. Following task 504, process control proceeds to a return block 506. Return block 506 indicates that a current iteration of HEL subprocess 406 is complete such that program control returns to a task 414 of transaction record classification process 400 (discussed below).

Returning to query task 500, when a determination is made that transaction record 130 is not related to a new HEL, subprocess 406 proceeds to a query task 508. At query task 508, a determination is made as to whether transaction record 130 is related to a currently existing fixed-rate HEL.

If so, process control proceeds to a task 510 where transaction record 130 is ignored. That is, the data associated with transaction record 130 is not relevant to the current models, and need not be analyzed. Following task 510, HEL subprocess 406 proceeds to return block 506, discussed above.

However, when a determination is made at query task 508 that transaction record 130 is not related to a currently existing fixed-rate HEL, subprocess 406 proceeds to a task 512. At task 512, transaction record 130 is assigned a state indicator of "CLOSED" identifying transaction record 130 as being related to an HEL account that was recently closed, or paid off. Following task 512, subprocess 406 continues with a task 514.

At task 514, transaction record 130 is assigned a model identifier of "AGE ID" so that the relevant data of transaction record 130 can be subsequently used as input data for average loan life model 308. Following task 514, HEL subprocess 406 proceeds to return block 506, discussed above.

FIG. 6

Figure 6:
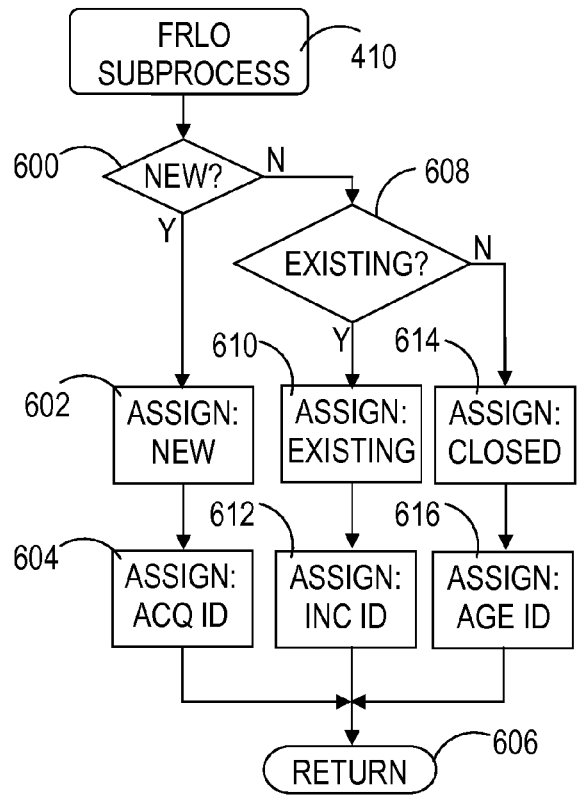
FIG. 6 shows a flowchart of a fixed-rate loan option subprocess of the transaction record classification process.

FIG. 6 shows a flowchart of fixed-rate loan option (FRLO) subprocess 410 of the transaction record classification process 400. It should be recalled that FRLO subprocess 410 is executed when query task 408 determines that the currently selected "next" transaction record 130 is related to a new FRLO, i.e. an FRLO that was originated within the same month of origination of the HELOC. The function of subprocess 410 is to classify transaction record 130 into one of three states: new, existing, or closed, and in response assign that transaction record 130 with an appropriate model identifier.

Accordingly, FRLO subprocess 410 begins with a query task 600. At query task 600, a determination is made as to whether the currently selected transaction record 130 is related to a recently originated FRLO. When transaction record 130 is related to a recently originated FRLO, subprocess 410 proceeds to a task 602.

At task 602, transaction record 130 is assigned a state indicator of "NEW" identifying transaction record 130 as being related to a recently originated FRLO. Following task 602, subprocess 410 proceeds to a task 604.

At task 604, transaction record 130 is assigned a model identifier of "ACQ ID" so that the relevant data of transaction record 130 can be subsequently used as input data for acquisition model 300. Following task 604, process control proceeds to a return block 606. Return block 606 indicates that a current iteration of FRLO subprocess 410 is complete such that program control returns to task 414 of transaction record classification process 400 (discussed below).

Returning to query task 600, when a determination is made that transaction record 130 is not related to a recently acquired FRLO, subprocess 410 proceeds to a query task 608. At query task 608, a determination is made as to whether transaction record 130 is related to a currently existing FRLO.

If so, process control proceeds to a task 610. At task 610, transaction record 130 is assigned a state indicator of "EXISTING" identifying transaction record 130 as being related to a currently existing FRLO. Following task 610, subprocess 410 proceeds to a task 612.

At task 612, transaction record 130 is assigned a model identifier of "INC ID" so that the relevant data of transaction record 130 can be subsequently used as input data for line increase model 306. Following task 612, FRLO subprocess 410 proceeds to return block 606, discussed above.

Returning to query task 608, when a determination is made that transaction record 130 is not related to a currently existing FRLO, subprocess 410 proceeds to a task 614. At task 614, transaction record 130 is assigned a state indicator of "CLOSED" identifying transaction record 130 as being related to an FRLO account that was recently closed, or paid off. Following task 614, subprocess 410 proceeds to a task 616.

At task 616, transaction record 130 is assigned a model identifier of "AGE ID" so that the relevant data of transaction record 130 can be subsequently used as input data for average loan life model 308. Following task 616, FRLO subprocess 410 proceeds to return block 606, discussed above.

FIG. 7

Figure 7:
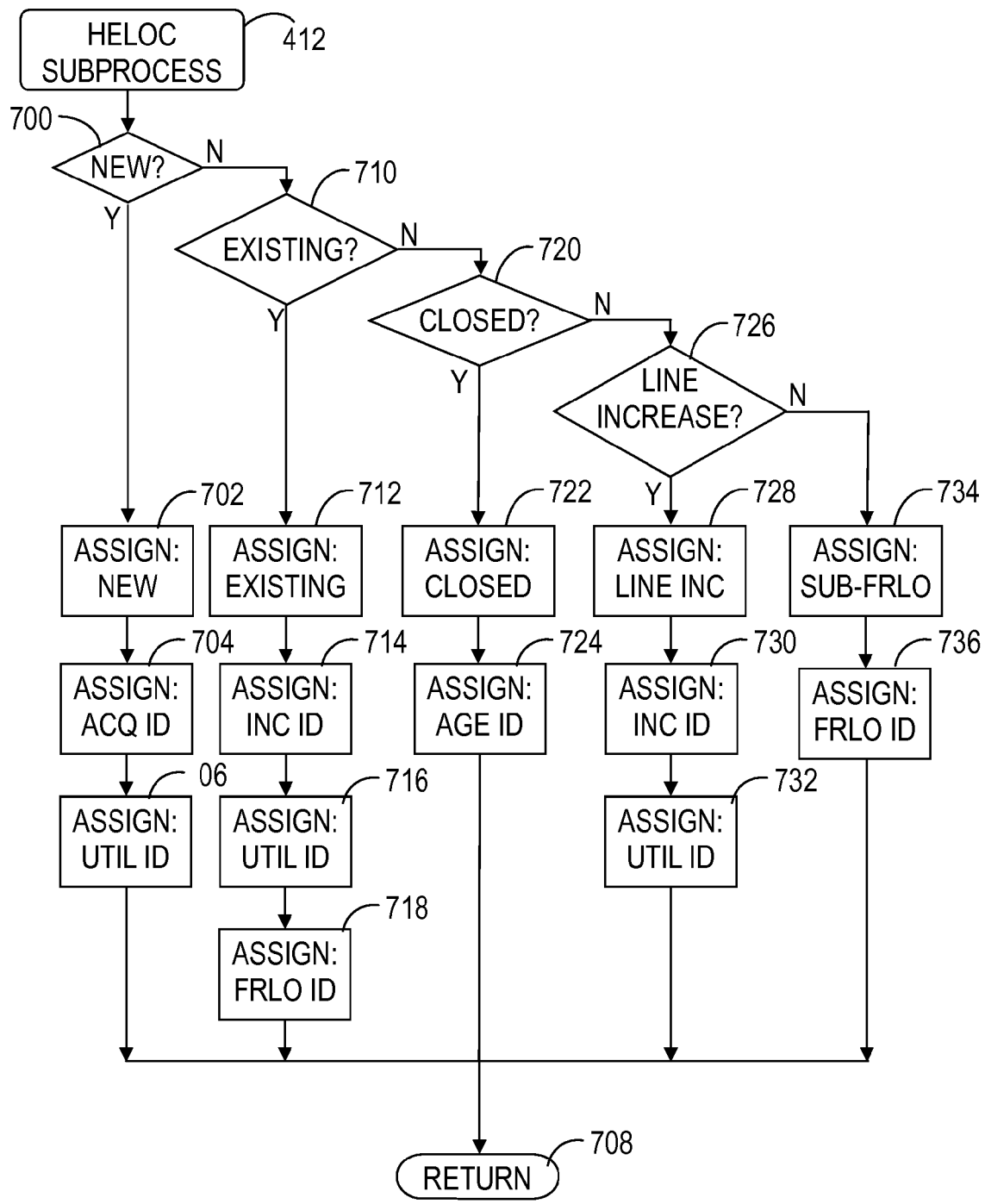
FIG. 7 shows a flowchart of a home equity line of credit subprocess of the transaction record classification process.

FIG. 7 shows a flowchart of home equity line of credit (HELOC) subprocess 412 of transaction record classification process 400. It should be recalled that HELOC subprocess 412 is executed when query task 408 determines that the currently selected "next" transaction record 130 is related to an HELOC. The function of subprocess 412 is to classify transaction record 130 into one of five states: new, existing, closed, line increase, and subsequent FRLO and in response assign that transaction record 130 with one or more appropriate model identifiers.

Accordingly, HELOC subprocess 412 begins with a query task 700. At query task 700, a determination is made as to whether the currently selected transaction record 130 is related a recently originated HELOC. When transaction record 130 is related to a recently originated HELOC, subprocess 412 proceeds to a task 702.

At task 702, transaction record 130 is assigned a state indicator of "NEW" identifying transaction record 130 as being related to a recently originated HELOC. Following task 702, subprocess 412 proceeds to a task 704.

At task 704, transaction record 130 is assigned a model identifier of "ACQ ID" so that the relevant data of transaction record 130 can be subsequently used as input data for acquisition model 300. Following task 704, process control continues with a task 706.

At task 706, transaction record 130 is additionally assigned a model identifier of "UTIL ID" so that the relevant data of transaction record 130 can also be utilized as input data for utilization model 302. Next, HELOC subprocess 412 proceeds to a return block 708. Return block 708 indicates that a current iteration of HELOC subprocess 412 is complete such that program control returns to task 414 of transaction record classification process 400 (discussed below).

Returning to query task 700, when a determination is made that transaction record 130 is not related to a recently acquired HELOC, subprocess 412 proceeds to a query task 710. At query task 710, a determination is made as to whether transaction record 130 is related to a currently existing HELOC.

If so, process control proceeds to a task 712. At task 712, transaction record 130 is assigned a state indicator of "EXISTING" identifying transaction record 130 as being related to a currently existing HELOC. In addition, at task 712, a determination can be made as to how old the currently existing HELOC account is and this age information can be saved in association with the state indicator for transaction record 130. Following task 712, subprocess 412 proceeds to a task 714.

At task 714, transaction record 130 is assigned a model identifier of "INC ID" so that the relevant data of transaction record 130 can be subsequently used as input data for line increase model 306. Following task 714, HELOC subprocess 412 continues with a task 716.

At task 716, transaction record 130 is additionally assigned a model identifier of "UTIL ID" so that the relevant data of transaction record 130 can also be utilized as input data for utilization model 302. Next, HELOC subprocess 412 proceeds to a task 718.

At task 718, transaction record 130 is assigned yet another model identifier. In particular, transaction record 130 is assigned a model identifier of "FRLO ID" so that the relevant data of transaction record 130 can also be utilized as input data for FRLO propensity model 302. Following task 718, subprocess 412 proceeds to return block 708, discussed above.

Returning to query task 710, when a determination is made that transaction record 130 is not related to a currently existing HELOC, subprocess 412 proceeds to a query task 720. At query task 720, a determination is made as to whether transaction record 130 is related to an HELOC account that was recently closed, or paid off. If so, process control proceeds to a task 722.

At task 722, transaction record 130 is assigned a state indicator of "CLOSED" identifying transaction record 130 as being related to an HELOC account that was recently closed, or paid off. Following task 722, subprocess 410 proceeds to a task 724.

At task 724, transaction record 130 is assigned a model identifier of "AGE ID" so that the relevant data of transaction record 130 can be subsequently used as input data for average loan life model 308. Following task 724, HELOC subprocess 412 proceeds to return block 708, discussed above.

Returning to query task 720, when a determination is made that transaction record 130 is not related to an HELOC account that was recently paid off, HELOC subprocess 412 proceeds to a query task 726. At query task 726, a determination is made as to whether transaction record 130 is related to an HELOC account that recently experienced a line increase, i.e., an increase in a maximum amount available for borrowing. If so, process control proceeds to a task 728.

At task 728, transaction record 130 is assigned a state indicator of "LINE INC" identifying transaction record 130 as being related to an HELOC account that recently experienced a line increase. Following task 728, subprocess 412 proceeds to a task 730.

At task 730, transaction record 130 is assigned a model identifier of "INC ID" so that the relevant data of transaction record 130 can be subsequently used as input data for line increase model 306. Following task 730, HELOC subprocess 412 continues with a task 732.

At task 732, transaction record 130 is additionally assigned a model identifier of "UTIL ID" so that the relevant data of transaction record 130 can also be utilized as input data for utilization model 302. Next, HELOC subprocess 412 proceeds to return block 708.

Returning to query task 726, when a determination is made that transaction record 130 is not related to an HELOC account that recently experienced a line increase then process control proceeds to a task 734.

At task 734, transaction record 130 is assigned a state indicator of "SUB-FRLO" identifying transaction record 130 as being related to an HELOC account that recently experienced a subsequent FRLO conversion. The term "subsequent" utilized herein refers to an FRLO origination for an HELOC account that has been existing for an extended period of time, for example, greater than one month. Following task 734, subprocess 412 proceeds to a task 736.

At task 736, transaction record 130 is assigned a model identifier of "FRLO ID" so that the relevant data of transaction record 130 can be subsequently used as input data for FRLO propensity model 304. Following task 736, HELOC subprocess 412 proceeds to return block 608, discussed above.

The activities of HEL subprocess 406, FRLO subprocess 410, and HELOC subprocess 412 yield a set of transaction records 130 identified by a state indicator (NEW, EXISTING, CLOSED, LINE INC, and SUB-FRLO) responsive to customer behaviors observed in each of transaction records 130. These observed customer behaviors are utilized to assign model identifiers (ACQ ID, UTIL ID, FRLO ID, INC ID, and AGE ID). Each of the five demand models, acquisition model 300, utilization model 302, FRLO propensity model 304, line increase model 306, and average loan life model 308) look at the relevant state indicator and model identifier to read the input data it needs to perform the modeling. For example, acquisition model 300 evaluates the new origination data from HEL, HELOC, and FRLO transaction records 130. Utilization model 302 evaluates data from new, existing, and line increased HELOC transaction records 130 to calculate balance utilization. FRLO propensity model 304 evaluates data from existing HELOC and subsequent FRLO transaction records 130 to estimate the propensity for FRLO conversion. Line increase model 306 evaluates data from existing FRLO, HELOC, and line increased HELOC transaction records to determine the probability for a line increase. Finally, average loan life model 308 evaluates data from paid-off, or closed HEL, HELOC, and/or FRLO transaction records 130 to calculate the age of each closed account.

FIG. 4 Continued

Referring back to classification process 400, following the execution of any of HEL subprocess 406, FRLO subprocess 410, and HELOC subprocess 412 and the return to process 400, program control proceeds to task 414. At task 414, the selected transaction record is stored in database 120 as an entry in transaction data record 202 along with its corresponding state indicator and model identifier(s). Transaction data record 202 will be discussed below in connection with FIG. 8.

Following task 414, a query task 416 is performed to determine whether there is another of transaction records 130 input into modeler section 102 via input 106. When there is another transaction record 130, classification process 400 loops back to task 402 to select the "next" one of transaction records 130. However, when query task 416 determines that there are no more transaction records 130 to be classified, transaction record classification process 400 exits having built a historical database, i.e. transaction data record 202, of transaction records 130 that are classified by customer behaviors observed in transaction records 130 and are assigned for utilization by the independent demand models of the present invention in accordance with the observed customer behaviors.

FIG. 8

Figures 8, 9:
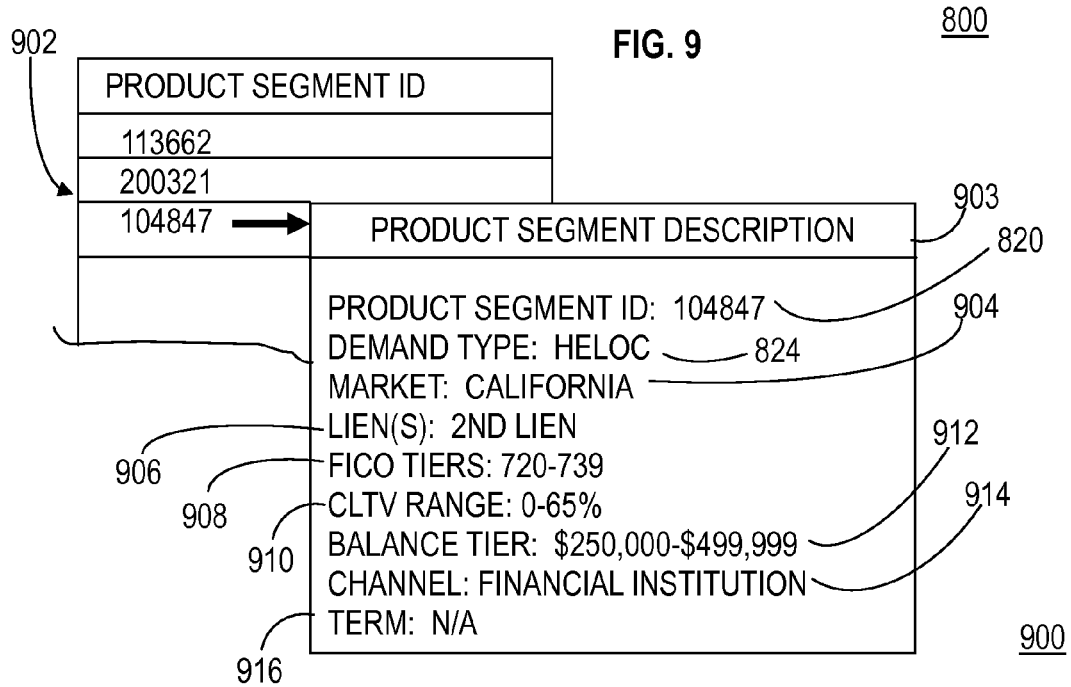
FIG. 8 shows a table representing a transaction data record with transaction records classified in accordance with the transaction record classification process.
FIG. 9 shows a table representing a product segment definition record in a database including a number of product segments.

FIG. 8 shows a table 800 representing transaction data record 202 with transaction records 130 classified in accordance with transaction record classification process 400. Transaction data, such as the exemplary transaction data record 202, is assembled in response to the execution of transaction record classification process 400 for utilization by model engine 110. Transaction data record 202 includes a plurality of transaction records 130, each of which is assigned a state indicator 802 and one or more model identifiers 804. Table 800 is provided for explanatory purposes. Those skilled in the art will recognize that data included in transaction data record 202 can take various forms and may include more or less information than that which is shown.

Vertically arranged columns of table 800 include a number of data entry fields. These data entry fields include a transaction record identification field 806, a product segment field 808, a rate field 810, a demand type/transaction parameters field 812, a state indicator field 814, and a model identifier field 816. Each horizontally arranged row of table 800 represents one of transaction records 130 recorded in transaction data record 202.

As such, each of transaction records 130 has associated therewith, a transaction identifier 818 in transaction record identification field 806, a product segment identifier 820 in product segment field 808, a current loan price or interest rate 822 in rate field 810, and a demand type 824 and transaction parameters 826 in field 812. In accordance with execution of transaction record classification process 400, each of transaction records 130 also has associated therewith state indicator 802 and one or more model identifiers 804.

Model engine 110 accesses particular transaction records 130 in transaction data record 202 to obtain input data, such as product segment information related to product segment identifier 820, current rate 822, demand type 824, and transaction parameters 826 by looking for the relevant state indicator 802 and model identifier(s) 804. For example, when model engine 110 is executing acquisition model 300, any transaction records 130 having an "ACQ ID" model identifier 804 will be accessed to obtain input data for acquisition model 300. Likewise, when model engine 110 is executing utilization model 302, any transaction records 130 having a "UTIL ID" model identifier 804 will be accessed to obtain input data for utilization model 302, and so forth. It should be noted that transaction records 130 having two or more model identifiers 804 may be accessed to obtain input data for the execution of the corresponding two or more of the independent demand models.

FIG. 9

FIG. 9 shows a table 900 representing product segment definition record 200 in database 120 including a number of product segments 902. As discussed above, a financial institution organizes and prices their loan products into "products" or "product segments" that are distinguished by different product attributes. A unique combination of these attributes thus forms a product segment. Table 900 is provided for explanatory purposes. It should be understood that data included in product segment definition record 200 can take various forms and may include more or less information than that which is shown.

A product segment description 903 is provided for one of product segments 902 identified by product segment identifier 820 as "104847." Product segment description 903 includes product segment identifier 820, demand type 824, a target market attribute 904, a lien position attribute 906, and a Fair Isaac Corporation (FICO) score range attribute 908. Product segment 902 further includes a combined loan to value (CLTV) range attribute 910, a balance tier attribute 912, a channel attribute 914, and a term attribute 916. In accordance with one embodiment, model engine 110 can model demand for each of product segments 902, and borrowers within the same product segment 902 are assumed to respond to rate changes in a similar way.

FIG. 10

FIG. 10 shows a table 1000 representing the mathematical operations of acquisition model 300 implemented within model engine 110. Acquisition model 300 is initiated to explicitly identify the relationship between a quantity of loan originations and loan prices. Thus, acquisition model 300 can be used to predict the origination dollar volume per time period, such as per week or month for each of product segments 902. As shown in table 1000, the general functional form, the expression for modeled number of originations for a given product segment 902 as a function of interest rate and other explanatory factors, is provided by an exponential regression function 1002. It should be understood that the exact functional form of acquisition model 300, as well as the below presented utilization model 302, FRLO propensity model 304, line increase model 306, and average loan life model 308, may take various forms and modifications known to those skilled in the art.

Given an observation data set, i.e. transaction records 130, of historical data, modeling can be a Bayesian estimation process that identifies model parameters, $\beta$, 318 such that the probability of observing the data given the model parameters, $\beta$, 318 is maximized. That is, the model engine 110 finds the acquisition model parameters 318 that would most likely generate the given data. The non-linear nature of acquisition model 300 necessitates the use of an iterative solution. Model engine 110 may, for example, employ a Newton-Raphson technique, which is a widely accepted method for finding solutions to nonlinear equations. This Newton-Raphson method involves iterative steps, each a refinement on the model parameter estimate, until a convergence criterion is met. Objective function 312 is used for model estimation. A dollar volume of loan originations can then be computed as the product of average commitment amount and the quantity of originations.

FIG. 11

FIG. 11 shows a table 1100 representing the mathematical operations of utilization model 302 implemented within model engine 110. Utilization model 302 is initiated to explicitly isolate and quantify the relationship between utilization ratio and loan prices. Thus, utilization model 302 can be used to predict the percent of commitment amount expected to be utilized by customers per period of time, for example, per week, for each HELOC loan product.

In a HELOC loan product, the origination amount only represents a "line-limit" or total amount that a customer may borrow. Typically, most customers only utilize a small portion of the line-limit, upon which interest rate (i.e., the loan price) is computed and collected. Therefore, combining an origination amount and utilization percentage of the origination amount creates a true "balance" amount and represents a generally accurate way to capture the interest rate/dollar volume trade-off.

As shown in table 1100, the utilization ratio is computed by dividing actually utilized balance by the line of credit for each HELOC account, as represented by a ratio function 1102. In addition, the general functional form, the expression for modeled utilization ratios for a given product as a function of interest rates, is provided by a logit function 1104, and modeling of related transaction records 130 using utilization model 302 identifies model parameters, $\beta$, 318.

In order to model and predict an entire utilization curve, which consists of utilization ratios of an HELOC product segment at different ages, utilization model 302 uses an iterative process. In each iteration, it models one point (i.e., the utilization ratio of a product segment at a specific age, such as 3-months old) over time and the iterations are repeated for all points on a utilization curve. All of the point estimates are then combined to construct the entire utilization curve. An estimated utilization curve is particular useful for calculating net present value (NPV), i.e., the present value of the expected future cash flows minus the cost, for each product segment 902.

The most important feature of utilization model 302 is that it recognizes and models the time-dependent and rate-dependent properties of utilization ratios. That means that when rates change over time, not only the level of utilization curve but also the shape of the utilization curve changes. Financial institutions typically estimate utilization ratios using ad hoc averaging over the committed dollars to the credit limits across certain product segments. This traditional method ignores the important rate-utilization tradeoff. Incorporation of utilization model 302 into model engine 110 results in more accurate predictions on interest rate impact on net asset value, which is a key metric for financial institutions to analyze their home equity loan portfolio performance.

FIG. 12

FIG. 12 shows a table 1200 representing the mathematical operations of fixed-rate conversion (FRLO) propensity model 304 implemented within model engine 110. Some financial institutions let borrowers take fixed-rate loans from their home equity line of credit (HELOC) if they choose, an option usually called FRLO (Fixed-Rate Loan Option). An FRLO is like a fixed-rate loan and variable-rate line of credit in one account. Thus, an FRLO provides borrowers with the opportunity of take advantage of variable rates while they are low, and to convert to fixed rates when they start to climb. Some borrowers may even have the option to make interest-only payments when they open an FRLO. Therefore, not surprisingly, FRLO conversion quickly becomes very popular choice.

FRLO propensity model 304 identifies the relationship between FRLO conversion propensity and rates, and thus predicts the probability of FRLO conversion for possible rate changes on an HELOC account. That is, FRLO propensity model 304 is initiated to identify a quantity of fixed-rate conversion occurrences of loans. The FRLO conversion probability is defined as the ratio of the quantity of subsequent FRLOs over the quantity of HELOCs for a product segment that are available for conversion to FRLOs, as represented in table 1200 by a ratio function 1202. The general functional form, the expression for modeled probability of FRLO conversion for a given product segment as a function of rate, is given by a logit function 1204, and modeling of the related transaction records 130 using FRLO propensity model 304 identifies model parameters, β, 318.

FIG. 13

FIG. 13 shows a table representing the mathematical operations of line increase propensity model 306 implemented within model engine 110. For HELOC loan products, financial institutions typically allow borrowers to increase their line of credit, and sometimes even encourage customers to do so. In most cases, line-increases are re-priced through the same pricing engine as that for new originations. Therefore, in modeling interest rate/dollar volume trade-offs, financial institutions are eager to account for the impact of line-increase on their loan portfolio such as possible spread compression, increased balances, and so forth.

Line increase propensity model 306 is initiated to explicitly isolate and quantify the relationship between the probability of line increase and rates, i.e. to identify a quantity of line-increase occurrences for loans. Thus, line increase propensity model 306 can be used to predict how likely customers will increase their lines if rates change. The line-increase probability is defined as the ratio of the quantity of line-increased HELOCs over the number of regular HELOCs for a HELOC product segment, as represented in table 1300 by a ratio function 1302. The general functional form, the expression for modeled probability of line increase for a given product segment as a function of price, is given by a logit function 1304, as shown in table 1300, and modeling of related transaction records 130 using line increase propensity model 306 identifies model parameters, β, 318.

FIG. 14

FIG. 14 shows a table 1400 representing mathematical operations of average loan life model 308 implemented within model engine 110. Rather than assuming a constant average life across all products, average loan life model 308 is a statistic model that is initiated to predict the average age of closed loans under different rate/price scenarios, and to infer average life expectancy of loans at various rates. This average life expectancy can then be used within the profit computation as a refinement on a static client assumption. It should be understood that average loan life model 308 is developed mainly for variable-rate HELOC loan products which have traditionally a long contract term (e.g. 15- or 30-year), but a short life expectancy (e.g. 3-year). In this case, an accurate estimation of life expectancy is critical to profit calculation and portfolio performance management. Even though the life expectancy for fixed-rate loan products (i.e., HELs and FRLOs) is typically close to the contract term of the loan, average loan life model 308 can still be applied to those products to obtain an estimation of pre-payment activity.

Average loan life model 308 explicitly identifies the relationship between average life expectancy and rates, thus predicts on average how long a loan (HEL, HELOC, and/or FRLO) in each product segment may stay active. The general functional form, the expression for modeled average age for a given product as a function of rates, is given by a functional objective 1402 as shown in table 1400, and modeling of transaction records 130 using average loan life model 308 identifies model parameters, β, 318.

FIG. 15

Figure 15:
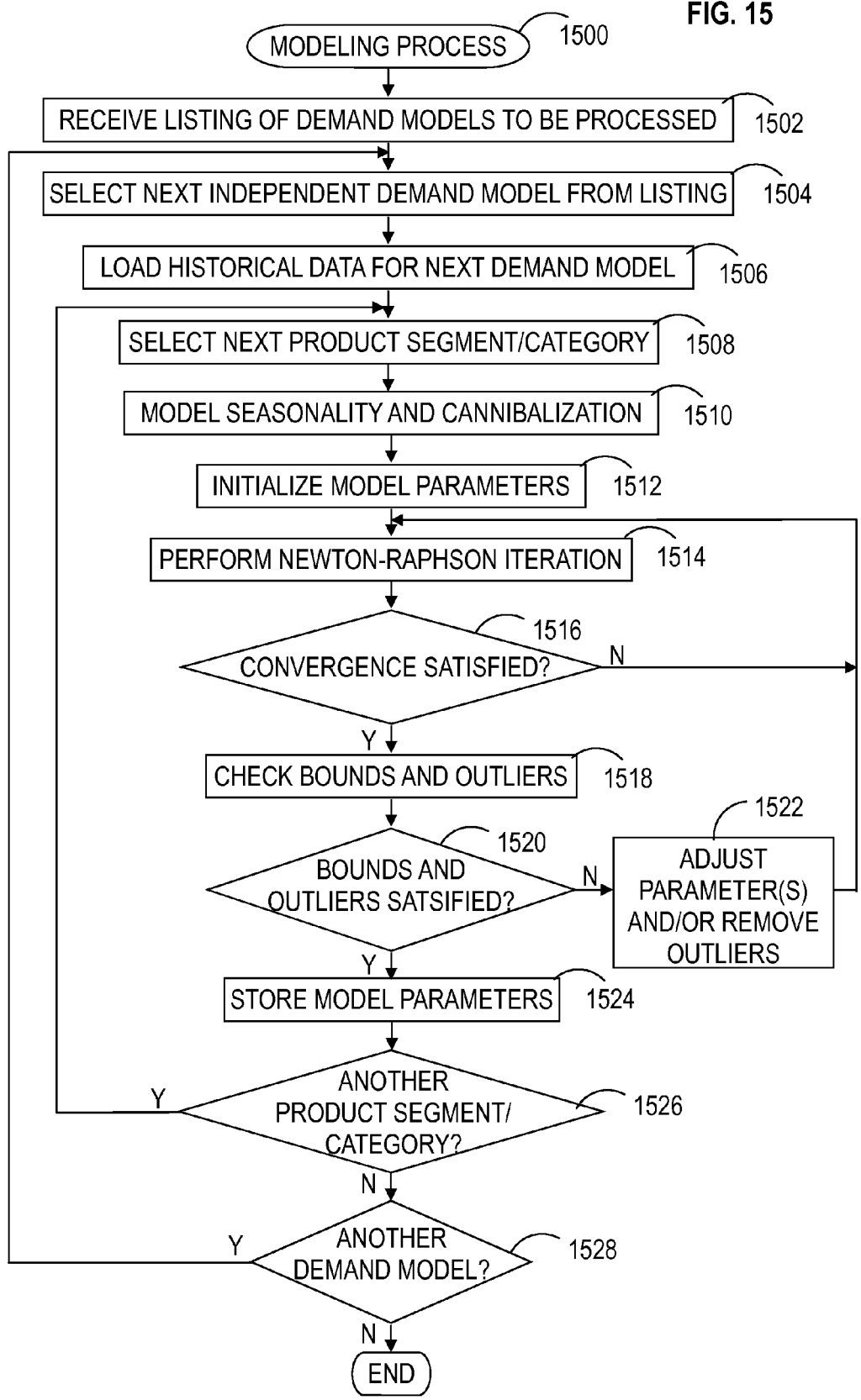
FIG. 15 shows a flowchart of a modeling process performed by the model engine.

FIG. 15 shows a flowchart of a modeling process 1500 performed by model engine 110 of computing system 100. Modeling process 1500 is executed by model engine 110 to determine model parameters, β, for each of the independent demand models. The determined model parameters, β, can then be utilized by performance indicator forecaster 112 to compute performance indicators indicative of customer behaviors as a function of changes in interest rates within a product segment 902 (discussed below). Modeling process 1500 begins with a task 1502.

At task 1502, a listing of independent demand models is received. It may be recalled that process control 116 enables a user to select one or more of the independent demand models, i.e., acquisition model 300, utilization model 302, FRLO propensity model 304, line increase model 306, and/or average loan life model 308, to be processed. For example, a financial institution that does not offer an FRLO conversion loan product may not desire to execute FRLO propensity model 304. Thus, in such a situation, the financial institution may provide in the listing the remaining four of the demand models, with the exception of FRLO propensity model 304.

A task 1504 is performed in response to receipt of the listing of demand models to be processed. At task 1504, model engine 110 selects a "next" independent demand model from the listing for processing. Model engine 110 executes a modeling cycle for those demand models, i.e., acquisition model 300, utilization model 302, fixed-rate loan option (FRLO) propensity model 304, line increase model 306, and/or average loan life model 308, identified in the listing. Model engine 110 operates on a hierarchy determined by the user input listing of the independent demand models that are to be executed. Thus, within each modeling cycle, model engine 110 processes one instance of modeling hierarchy at a time. It should be understood that during a first iteration of task 1504, the "next" independent demand model from the listing is a first one of the demand models in the hierarchy.

A task 1506 is performed in response to demand model selection at task 1504. At task 1506, model engine 110 loads the input data including all parameters and hierarchy information from database 120. In one embodiment, this may include two years of transaction records 130 and portfolio data in, for example, a weekly feed. The selected transaction records 130 are those from transaction data record 202 that have been assigned model identifier 804 associated with the selected demand model. For example, when acquisition model 300 is selected at task 1504, those transaction records 130 having assigned thereto "ACQ ID" will be loaded as input data at task 1506. In addition to transaction records 130, model engine loads relevant product segment definition 200, competitor data 132, macroeconomic data 134, and housing market data 136 from database 120.

Following task 1506, a task 1508 is performed. At task 1508, model engine 110 selects one of product segments 902 defined in product segment definition 200 for which modeling is to be performed. At task 1508, model engine 110 may also select one of a set of product categories, each of which is a collection of product segments with similar seasonal behavior and cannibalization effect, for which modeling is to be performed. It should be understood that in the following discussion of modeling process 1500, modeling can be performed at either product segment or product category level.

Next, a task 1510 models seasonality and cannibalization specific to the selected one of product segments 902. Seasonality is generally recognized as the variation in sales for goods and services through the year, depending upon the season. Cannibalization refers to the phenomenon whereby sales of a product have a negative effect on sales of another product in the same category. In each of acquisition model 300, utilization model 302, fixed-rate loan option (FRLO) propensity model 304, line increase model 306, and/or average loan life model 308, seasonality is represented by $D_i$, and cannibalization is represented by $S_i$. $D_i$ is the time dependent demand, a variable measuring the seasonal variation of demand for product segment i, 902. $S_i$ is the cannibalization factor, a variable measuring the cannibalization impact on demand for product segment i, 902. Seasonality, $D_i$, and cannibalization, $S_i$, may be modeled utilizing any appropriate model known to those skilled in the art.

Following task 1510, a task 1512 is performed. At task 1512, model engine 110 initializes model parameters, $\beta$, for the selected demand model. Referring briefly to FIG. 10, acquisition model 300 includes six model parameters 318, i.e., $\beta_0$, $\beta_1$, $\beta_2$, $\beta_3$, $\beta_4$, $\beta_5$. $\beta_0$ represents the value of the dependent variable, e.g. dollar volume, when all independent variables, e.g. interest rate, margin, competitor rate, and so forth are equal to 0. In a linear regression function, $\beta_0$ is typically referred to as an intercept, whereas in a non-linear demand function, $\beta_0$ is typically referred to as base demand. Its function is to correct the systematic bias for model estimates. Model parameters 318, i.e., $\beta_1$, $\beta_2$, $\beta_3$, $\beta_4$, $\beta_5$, are associated with the independent variables. For example, $\beta_1$ is associated with the weighted average of interest rate, $R_i$, $\beta_2$ is associated with the average margin rate, $M_i$, and so forth.

With reference back to FIG. 15, next at a task 1514, model engine 110 performs a Newton-Raphson iteration to tune model parameters 318 to the historical data, input from transaction records 130, competitor data 132, macroeconomic data 134, and housing market data 136, using objective function 312. That is, model engine 110 computes the model parameter vector, $\beta_j$, that maximize the log likelihood, L, of the posteriori term by setting gradient 314 and solving the equation represented as objective function 312 using the Newton-Raphson method.

A query task 1516 is performed in connection with task 1514. At query task 1516, model engine 110 determines whether convergence is satisfied. When convergence is not satisfied, process control loops back to task 1514 to perform another iterative step. In one embodiment, the convergence tolerance may be set to a default value of $10^{-6}$. As such, model engine 110 may converge in seven or fewer iteration steps. When convergence is satisfied, process control proceeds to a task 1518.

At task 1518, model engine 110 checks for bounds, i.e., upper and/or lower limits, and outliers, i.e. observations in a data set which are far removed in value from the others in the data set.

A query task 1520 is performed in connection with task 1518. At query task 1520, model engine 110 determines whether bounds and outlier requirements are satisfied. When bounds and outlier requirements are not satisfied, process control proceeds to a task 1522.

At task 1522, model engine 110 removes any outliers and/or adjusts some of model parameters 318. Modeling process 1500 loops back to task 1514 to repeat the Newton-Raphson iteration to tune the model parameters 318. This process is repeated until no model parameters 318 are out of bounds and there are no outliers. Thus, when query task 1520 determines that bounds and outlier requirements are satisfied, modeling process continues with a task 1524.

At task 1524, the model parameters, $\beta$, 318 obtained through execution of the Newton-Raphson iteration at task 1524 are stored, for example, in parameter/forecast output record 138. Following task 1524, modeling process 1500 proceeds to a query task 1526.

At query task 1526, a determination is made as to whether another of product segments 902 is to be modeled utilizing the currently selected demand model. When there is another of product segments 902 to be modeled, modeling process 1500 loops back to task 1508 to select the next product segment, and repeat the modeling operations to obtain model parameters, $\beta$, 318 corresponding to the next one of product segments 902. However, when query task 1526 determines that there are no further product segments 902, process control proceeds to a query task 1528.

At query task 1528, a determination is made as to whether there is another demand model, i.e. another of acquisition model 300, utilization model 302, FRLO propensity model 304, line increase model 306, and/or average loan life model 308, to be processed. When there is another one of the demand models in the listing of demand models received at task 1502, modeling process 1500 loops back to task 1504 to select the next independent demand model from the listing. However, when there are no further independent demand models to be processed, modeling process 1500 exits. Accordingly, model engine 110 executes modeling process 1500 to dynamically determine all model parameters, β, 318 for each independent demand model within each of product segments 902.

FIG. 16

FIG. 16 shows a table 1600 representing a portion of a parameter section 1602 of parameter/forecast output record 138 resulting from an iteration of modeling process 1500. Table 1600 includes product description 903 for one of product segments 902, identified by product segment identifier 820. In addition, product segment 902 has a set of model parameters, β, 318 for acquisition model 300 their corresponding explanatory variables 1604, and computed parameter values 1606. Table 1600 may also include standard deviation values 1608 and variance values 1610 for each of model parameters 318. Table 1600 is provided for explanatory purpose. It should be understood, however, that data included in parameter section 1602 of record 138 can take various forms and may include more or less information than that which is shown.

The outcome of execution of the program code of model engine 110 are a set of parameter values 1606 corresponding to particular model parameters 318 for each of the demand models. Parameter values 1606 computed for model parameters 318 can be used by performance indicator forecaster 112 to compute performance indicators (discussed below) for each of the independent demand models, and to determine relationships between the performance indicators and various prices for a particular product segment.

FIG. 17

FIG. 17 shows a table 1700 of customer behaviors 1702 that are modeled in accordance with an embodiment of the present invention. As discussed above, loan rate changes can elicit a number of customer behaviors, or responses. As shown, these customer behaviors 1702 include applying for a new HEL or HELOC, referred to as an origination behavior 1704, and/or utilizing more balance of their existing account, referred to as a utilization behavior 1706. Other customer behaviors responsive to rate changes include converting to an FRLO is referred to as FRLO conversion behavior 1708, increasing their line of credit, referred to as a line increase behavior 1710, and extending or shortening the life of their existing loan, referred to as a loan life adjustment behavior 1712.

Each of customer behaviors 1702 is associated with one of a number of independent demand models 1714 and at least one of a number of performance indicators 1716. For example, origination behavior 1704 is modeled in accordance with acquisition model 300, and one of performance indicators 1716 indicative of origination behavior 1704 is an origination volume 1718. Similarly, utilization behavior 1706 is modeled in accordance with utilization model 302, and one of performance indicators 1716 indicative of utilization behavior 1706 is a utilization ratio 1720. FRLO conversion behavior 1708 is modeled in accordance with FRLO propensity model 304, and one of performance indicators 1716 indicative of FRLO conversion behavior 1708 is a propensity for FRLO value 1722. Line increase behavior 1710 is modeled in accordance with line increase model 306, and one of performance indicators 1716 indicative of line increase behavior 1710 is a line increase probability value 1724. Loan life adjustment behavior 1712 is modeled in accordance with average loan life model 308, loan life adjustment behavior 1712 is a pay-off parameter 1726. Performance indicators 1716 and their relationship to loan prices are determined by performance indicator forecaster 112 utilizing model parameters 1604 obtained through the execution of modeling process 1500.

FIG. 18

FIG. 18 shows a flowchart of a performance indicator forecasting process 1800 performed by performance indicator forecaster 112 of computing system 100. Forecasting process 1800 is executed by forecaster 112 to compute performance indicators 1716 indicative of customer behaviors 1702 and to determine relationships between performance indicators 1716 and various loan prices, i.e., rates.

For example, parameter values 1606 for model parameters 318 obtained through execution of acquisition model 300 can be used by forecasting process 1800 to ascertain a relationship that correlates the quantity of loan originations with the various interest rates for loans within particular product segments 902. In addition, parameter values 1606 for model parameters 318 obtained through execution of utilization model 302 can be used by forecasting process 1800 to ascertain a relationship correlating an amount, or percentage, of usage of a line-limit of an HELOC loan product with the various interest rates for loans within particular product segments 902. Parameter values 1606 for model parameters 318 obtained through execution of FRLO propensity model 304 can be used by forecasting process 1800 to ascertain a relationship correlating the quantity of fixed-rate conversion occurrences with various loan prices for loans within particular product segments 902. Parameter values 1606 for model parameters 318 obtained through execution of line increase model 306 can be used by forecasting process 1800 to ascertain a relationship correlating the quantity of line-increase occurrences with various loan prices for loans within particular product segments 902. Parameter values 1606 for model parameters 318 obtained through execution of average loan life model 308 can be used by forecasting process 1800 to ascertain a relationship correlating the average life expectancy of loans at various loan prices within particular product segments 902.

Forecasting process 1800 begins with a task 1802. At task 1802, forecaster 112 receives model parameters 1604 obtained through the execution of modeling process 1500. For example, parameter section 1602 of table 1600 may be exported from model engine 110 to performance indicator forecaster 112.

Next, a task 1804 is performed. At task 1804, forecaster 112 selects one of product segments 902 defined in product segment definition 200 for which forecasting is to be performed. Of course, during a first iteration of forecasting process 1800, the "next" one of product segments 902 will be a first one of product segments 902.

Following selection of one of product segments 902, performance indicator forecaster 112 performs a task 1804. At task 1804, forecaster 112 computes performance indicators 1716 indicative of customer behaviors 1702 at various loan rates. That is, forecaster 112 takes model parameters 1604 and predicts various performance indicators 1716, such as origination volume 1718, utilization ratio 1720, propensity for FRLO value 1722, line increase probability value 1724, and pay-off parameter 1726, at different rates for the selected one of product segments 902.

By way of example, parameter values 1606 for model parameters 318 obtained from acquisition model 300 are used by forecaster 112 to compute at different rates the dollar volume (origination volume 1718) as the product of average commitment amount and a quantity of originations. Parameter values 1606 for model parameters 318 obtained from utilization model 302 are used by forecaster 112 to compute at different rates the utilization volume corresponding to utilization ratio 1720 to capture the rate-utilization volume trade-off. Parameter values 1606 for model parameters 318 obtained from FRLO propensity model 304 are used by forecaster 112 to compute at different rates the FRLO conversion probability, i.e., propensity for FRLO value 1722, as the ratio of the number of converted FRLOs over the number of HELOCs available for conversion to FRLO for the selected one of product segments 902. Parameter values 1606 for model parameters 318 obtained from line increase model 306 are used by forecaster 112 to compute at different rates the line increase probability, i.e. line increase probability value 1724, as the ratio of the number of line increased HELOCs over the number of regular HELOCs for an HELOC product segment 902. Parameter values 1606 for model parameters 318 obtained from average loan life model are used by forecaster 112 to compute loan life expectancy, i.e., pay-off parameter 1726, or how long a loan in product segment 902 stays active.

Following task 1806, a task 1808 is performed. At task 1808, forecaster 112 can determine a relationship between loan prices, or rates, and expected volume and profit for each of performance indicators 1716 quantifying customer behaviors 1702.

Next, a task 1810 combines these relationships. That is, the profit/volume values for each of performance indicators 1716 can be combined to compute a net asset value for the selected product segment 902 at various loan rates. One exemplary "combination" may be to summate all profit values for each of performance indicators 1716 for a particular interest rate, and to thus repeat this operation at each of the interest rates. Likewise, all dollar volume values for each of performance indicators 1716 for a particular interest rate, and to thus repeat this operation at each of the interest rates.

Following task 1810, a query task 1812 is performed. At query task 1812, a determination is made as to whether there is another of product segments 902 for which forecasting is to be performed. When there is another of product segments 902, forecasting process 1800 loops back to task 1804 to select the next product segment, and repeat the subsequent forecasting operations. However, when query task 1812 determines that there are no further product segments 902, process control proceeds to a task 1814.

At task 1814, the forecasted results are presented to a user. For example, the forecasted results may be presented in parameter forecast output record 138. Upon review of output record 138, a user may select a loan rate for a particular product segment 902 based upon the interest rate/profit/volume relationships presented therein. Additionally, or alternatively, the predicted interest rate/profit/volume relationships may be input into optimizer section 104 to find optimal loan prices for each of product segments 902, discussed below.

FIG. 19

FIG. 19 shows a table 1900 representing a portion of a forecast section 1901 of parameter/forecast output record 138. Forecast section 1901 includes exemplary forecasting results 1902 identified by product segment definition 903 resulting from an iteration of forecasting process 1800. In general, table 1900 includes a list of varying interest rates 1904. Associated with interest rates 1904 are profit values 1906, in the form of a net present value, and dollar volume values 1908. A current interest rate 1910 is distinguished by the term "Current" placed by it. Table 1900 illustrates the relationship between loan prices and both profit and dollar volume for the particular one of product segments 902. Although forecasting results 1902 are illustrated in tabular form, results 1902 may alternatively or additionally be presented in graphical form. For example, time series and/or regression graphs can also be generated by output 114 along with parameter values 1604. Table 1900 is provided for explanatory purposes. It should be understood, however, that data included in forecasting section 1901 of parameter/forecast output record 138 can take various forms and may include more or less information than that which is shown.

A user may utilize forecasting results 1902 to select a price, i.e. one of interest rates 1902, for the particular product segment 902 for implementation by the financial institution within that product segment 902 of home equity loan products. For example, the user may select a lower interest rate 1912 as a replacement for current interest rate 1910 for implementation by the financial institution within the market. Alternatively, or in addition, forecasting results 1902 may be input into optimizer section 104 to predict future volume and profit growth for each product segment 902 at different interest rates 1904. Optimizer section 104 can then utilize the volume and profit forecasts relative to interest rate to determine an optimal interest rate for each product segment 902 given specific business objectives, discussed below.

FIG. 20

FIG. 20 shows a flowchart of an optimization process 2000 performed by price optimizer 122 of computing system 100. Optimization process is executed by price optimizer 122 to utilize forecasting results 1902 to determine optimal interest rates 1904 for various loan segments 902. Optimization process 2000 begins with a task 2002.

At task 2002, price optimizer 122 receives forecasting results 1902. Forecasting results 1902 may include performance indicator forecasts of profit 1906 and volume 1908 at various interest rates 1904 for each of a number of product segments 902.

Next, a task 2004 is performed. At task 2004, business rules are defined, or generated, in accordance with the goals of the particular financial institution. Business rules describe the operations, definitions, and constraints that apply to an organization in achieving its goals. For example, a financial institution may specify for a loan product, all other attributes being equal, that the optimized rate should decrease as the FICO score increases. A financial institution may also specify that the interest rate difference between FICO ranges should be at most, or at least, or exactly, a certain amount. Business rule generator 124 is executable code that translates these specifications into appropriate mathematical rules which are used as constraints in optimization computation by price optimizer 122.

Following task 2004, a task 2006 is performed. At task 2006, price optimizer selects a product hierarchy level, i.e., a group of product segments 902 defined in product segment definition 200, in a market for which optimization is to be performed. Of course, during a first iteration of optimization process 2000, the "next" product hierarchy will be a first product hierarchy.

Following task 2006, a task 2008 is executed by price optimizer 122. At task 2008, interest rates/prices are optimized for the selected product hierarchy. Typically, a financial institution can make more profits on some product segments 902 by raising rates and thus losing certain volume. At the same time, the financial institution can lower the rates on other products to make up the volume so that after the reshuffle/optimization, the final result is to become more profitable while maintaining the volume. So price optimization determines the correct trade-off among interest rates for various product segment 902, and thus is performed for a group of product segments 902, i.e., a product hierarchy.

Optimizer section 104 includes profit metrics calculator 126. Profit metrics calculator 126 may take cost and revenue assumptions from a financial institution and compute a profit estimate for each loan product so that price optimizer 122 can use this information to determine the profit or volume maximizing interest rates. In a typical situation, calculator 126 reads inputs (e.g., funding cost, processing cost, and net present value computation assumptions) from the user through input devices and returns the profit estimates to price optimizer 122. Price optimizer 122, implemented as a mathematical algorithm, solves a complex problem of determining the optimal prices, or interest rates, for product segments 902 of a loan product within the product hierarchy from a large number of pricing scenarios that involve multiple product segments 902, while maintaining a financial institution's business constraints. Thus, the result of an execution of task 2008 are interest rates for product segments 902 within the selected product hierarchy.

Following optimization task 2008, optimization process 2000 proceeds to a task 2010. At task 2010, the interest rates for the product segments 902 within the product hierarchy are stored in product segment price report 140.

Optimization process 2000 continues with a query task 2012. At query task 2012, a determination is made as to whether there is another product hierarchy level for which optimization is to be performed. When there is another product hierarchy level, optimization process 2000 loops back to task 2006 to select the next product hierarchy level, and repeat the subsequent optimization operations. However, when query task 2012 determines that there are no further product hierarchy levels, process control proceeds to a task 2014.

At task 2014, product segment price report 140 is presented to a user via reporting interface 124. Following task 2014, optimization process exits.

FIG. 21

FIG. 21 shows a table 2100 representing a portion of product segment price report 140 that may be presented to a user following execution of optimization process 2000. Table 2100 provides a list of product segments 902 identified by product segment identifiers 820. Associated with each product segment 902 is an optimal interest rate or price 2102 obtained through the execution of optimization process 2000. Thus, optimal price 2102 for product segment 902 may be selected by the financial institution. Once optimal interest rates 2102 are implemented in the market by the financial institution, new transaction records 130 and economic data can be read into database 120 and a new modeling cycle can begin. Table 2100 is provided for illustrative purposes. It should be understood, however, that product segment price report 140 may take various forms and may include more or less data than that which is shown.

In addition to utilizing historical data, i.e., transaction records 130, to model customer behaviors 1702 in response to interest rates, the present invention may additionally be utilized in "what-if" analysis. For example, after the parameter value 1606 of model parameters 318 are obtained and forecaster 112 computes profit 1906 and/or dollar volume 1908 forecasts relative to interest rates 1904, this information can be used in hypothetical scenarios of interest rates to determine how those hypothetical interest rates may affect profit 1906 and/or volume 1908.

In summary, the present invention teaches a computer-implemented, comprehensive and dynamic demand modeling system for home equity products, such as home equity loans and home equity lines of credit. The system models customer behavior throughout the lifecycle of a loan product and generates estimated values of interest rate elasticity, by determining relationships, i.e., trade-offs between interest rate, profit, and volume. In particular, the demand modeling system comprehensively models changes in a number of customer behaviors (loan originations, loan utilization, FRLO conversion propensity, line increase probability, and pay-off) as a function of changes in loan interest rates. The demand modeling system quantifies the historical relationships between interest rates, profit, and loan volumes and utilizes those relationships to forecast loan volumes at various rates. From these forecasts, interest rates can be selected for particular product segments of a home equity loan product for implementation in the market by a financial institution.

Although the preferred embodiments of the invention have been illustrated and described in detail, it will be readily apparent to those skilled in the art that various modifications may be made therein without departing from the spirit of the invention or from the scope of the appended claims. For example, the process steps discussed herein can take on great number of variations and can be performed in a differing order than that which was presented.

What is claimed is:

1. A computer program residing in memory and executable by a processor, said computer program being configured to provide a price for a product segment of a loan product offered by a financial institution, said computer program instructing said processor to perform operations comprising:

receiving transaction records for loans taken at various prices for said loan product;

classifying said transaction records in a database according to customer behaviors observed in said transaction records;

computing performance indicators indicative of said customer behaviors observed in said transaction records using independent demand models, said computing operation accessing said transaction records in said database classified in accordance with said customer behaviors for use in said computing operation;

determining relationships between said performance indicators and said various prices; and utilizing said relationships to select said price for said product segment for implementation by said financial institution;

wherein one of said customer behaviors is a line-increase behavior, and said computer program instructs said processor to perform further operations of said computing operation comprising:

initiating a line-increase propensity model for said line-increase behavior, one of said performance indicators for said line-increase propensity model being a quantity of line-increase occurrences for said loans; and ascertaining from said line-increase propensity model one of said relationships, said one relationship correlating said quantity of line-increase occurrences with said various prices for said loans.

2. A computer program as claimed in claim 1 wherein said loan product is a home equity product, and said computer program instructs said processor to perform a further operation of said receiving operation comprising obtaining housing market data to be utilized when computing said performance indicators.

3. A computer program as claimed in claim 1 wherein said each of said transaction records includes data characterizing one of said customer behaviors, and said computer program instructs said processor to perform further operations comprising:
assigning a model identifier to said each of said transaction records, said model identifier identifying one of said independent demand models; and
utilizing said model identifier to obtain said data from said database as input for said one of said independent demand models.

4. A computer program as claimed in claim 3 wherein for one of said transaction records, said model identifier is a first model identifier, said one of said independent demand models is a first independent demand model, and said computer program instructs said processor to perform further operations of said assigning operation comprising:
assigning a second model identifier to said one transaction record identifying a second one of said independent demand models; and
utilizing said second model identifier to obtain said data from said database as input for said second one of said independent demand models.

5. A computer program as claimed in claim 1 wherein said computer program instructs said processor to perform further operations of said computing operation comprising:
initiating one of said independent demand models for one of said customer behaviors;
selecting a subset of said transaction records classified in accordance with said one customer behavior, said subset of said transaction records including historical data corresponding to said one customer behavior;
implementing said one independent demand model to identify model parameters for said one independent demand model tuned to said historical data for said one customer behavior; and
utilizing said model parameters to compute said performance indicators.

6. A computer program as claimed in claim 1 wherein said computer program instructs said processor to perform further operations comprising:
separating said transaction records into groups, each of said groups representing one of various product segments of said loan product offered by said financial institution, said product segment being one of said various product segments; and
selecting one of said groups of said transaction records representing said product segment for use in said computing operation to determine said performance indicators specific to said product segment.

7. A computer program as claimed in claim 1 wherein said computer program instructs said processor to perform further operations comprising:
enabling a user to select a subset of said independent demand models; and
executing said computing operation using said subset of said independent demand models.

8. A computer program as claimed in claim 1 wherein one of said customer behaviors is an origination behavior, and said computer program instructs said processor to perform further operations of said computing operation comprising:
initiating an acquisition model for said origination behavior, one of said performance indicators for said acquisition model being a quantity of originations of said loans; and
ascertaining from said acquisition model one of said relationships, said one relationship correlating said quantity of originations with said various prices for said loans.

9. A computer program as claimed in claim 1 wherein one of said customer behaviors is a utilization behavior, and said computer program instructs said processor to perform further operations of said computing operation comprising:
initiating a utilization model for said utilization behavior, one of said performance indicators for said utilization model being an amount usage of a line-limit of said loan product; and
ascertaining from said utilization model one of said relationships, said one relationship correlating said amount usage of said line-limit with said various prices for said loans.

10. A computer program as claimed in claim 1 wherein one of said customer behaviors is a fixed-rate conversion behavior, and said computer program instructs said processor to perform further operations of said computing operation comprising:
initiating a fixed-rate conversion propensity model for said fixed-rate conversion behavior, one of said performance indicators for said fixed-rate conversion propensity model being a quantity of fixed-rate conversion occurrences of said loans; and
ascertaining from said fixed-rate conversion propensity model one of said relationships, said one relationship correlating said quantity of fixed-rate conversion occurrences with said various prices for said loans.

11. A computer program as claimed in claim 1 wherein one of said customer behaviors is a loan life adjustment behavior, and said computer program instructs said processor to perform further operations of said computing operation comprising:
initiating an average loan life model for said loan life adjustment behavior, one of said performance indicators for said average loan life model being an average life expectancy of said loans; and
ascertaining from said average loan life model one of said relationships, said one relationship correlating said average life expectancy of said loans with said various prices for said loans.

12. A computer program as claimed in claim 1 wherein said product segment is one of various product segments of said loan product, and said computer program instructs said processor to perform further operations comprising utilizing said relationships to select prices for others of said various product segments from said various prices for implementation by said financial institution.

13. A computer program as claimed in claim 1 wherein said computer program instructs said processor to perform further operations of said utilizing operation comprising:
interpreting said relationships to forecast demand for said loans in said product segment at said various prices; and
determining said price in response to said forecasted demand.

14. A computer program as claimed in claim 1 wherein said computer program instructs said processor to perform further operations of said utilizing operation comprising:
interpreting said relationships to forecast asset values resulting from said loans in said product segment at said various prices; and determining said price in response to said forecasted asset values.

15. A computer program as claimed in claim 1 wherein said computer program instructs said processor to perform further operations of said utilizing operation comprising:
combining said relationships with cost metrics and business constraints of said financial institution to determine said price; and
reporting said price to a user for implementation by said financial institution.

16. A computer program as claimed in claim 1 wherein said price is a first price, and said computer program instructs said processor to perform further operations comprising:
presenting to a user a first asset value for said product segment at said first price to a user;
receiving a second price from said user, said second price differing from said first price;
interpreting said relationships to forecast a second asset value resulting from said loans in said product segment at said second price; and
enabling said user to select one of said first and second prices for said product segment for implementation by said financial institution.

17. A computer-readable storage medium containing a computer program for providing a price for each of multiple price segments of a loan product offered by a financial institution comprising:
a memory element for storing a database of transaction records for loans taken at various prices for said loan product; and
executable code for instructing a processor to determine said price for said each of said multiple price segments, said executable code instructing said processor to perform operations comprising:
receiving transaction records for loans taken at various prices for said loan product;
classifying said transaction records in a database according to customer behaviors observed in said transaction records;
computing performance indicators indicative of said customer behaviors using independent demand models, said computing operation accessing said transaction records in said database classified in accordance with said customer behaviors;
determining relationships between said performance indicators and said various prices; and
utilizing said relationships to select said price for said each of said product segments for implementation by said financial institution;
wherein one of said customer behaviors is a line-increase behavior, said executable code instructing said processor to perform further operations comprising:
initiating a line-increase propensity model for said line-increase behavior, one of said performance indicators for said line-increase propensity model being a quantity of line-increase occurrences for said loans; and
ascertaining from said line-increase propensity model one of said relationships, said one relationship correlating said quantity of line-increase occurrences with said various prices for said loans.

18. A computer-readable storage medium as claimed in claim 17 wherein said each of said transaction records includes data characterizing one of said customer behaviors, and said executable code instructs said processor to perform further operations comprising:
assigning a model identifier to said each of said transaction records, said model identifier identifying one of said independent demand models; and
utilizing said model identifier to obtain said data from said database as input for said one of said independent demand models.

19. A computer-readable storage medium as claimed in claim 17 wherein said executable code instructs said processor to perform further operations of said computing operation comprising:
initiating one of said independent demand models for one of said customer behaviors;
selecting a subset of said transaction records classified in accordance with said one customer behavior, said subset of said transaction records including historical data corresponding to said one customer behavior;
implementing said one independent demand model to identify model parameters for said one independent demand model tuned to said historical data for said one customer behavior; and
utilizing said model parameters to compute said performance indicators.

20. A computer-readable storage medium as claimed in claim 17 wherein said computer program instructs said processor to perform further operations comprising:
separating said transaction records into groups, each of said groups representing one of said various product segments of said loan product offered by said financial institution; and
selecting one of said groups of said transaction records representing one of said product segments for use in said computing operation to determine said performance indicators specific to said one of said product segments.

21. A method comprising:
receiving, by a computer system, transaction records for loans taken at various prices for said loan product;
classifying, by the computer system, said transaction records in a database according to customer behaviors observed in said transaction records;
computing, by the computer system, performance indicators indicative of said customer behaviors observed in said transaction records using independent demand models, said computing operation accessing said transaction records in said database classified in accordance with said customer behaviors for use in said computing operation;
determining, by the computer system, relationships between said performance indicators and said various prices; and
utilizing, by the computer system, said relationships to select said price for said product segment for implementation by said financial institution;
wherein one of said customer behaviors is a line-increase behavior, the method further comprising:
initiating a line-increase propensity model for said line-increase behavior, one of said performance indicators for said line-increase propensity model being a quantity of line-increase occurrences for said loans; and
ascertaining from said line-increase propensity model one of said relationships, said one relationship correlating said quantity of line-increase occurrences with said various prices for said loans.

22. Apparatus comprising:
a computer system to:
receive transaction records for loans taken at various prices for said loan product;

classify said transaction records in a database according to customer behaviors observed in said transaction records;

compute performance indicators indicative of said customer behaviors observed in said transaction records using independent demand models, said computing operation accessing said transaction records in said database classified in accordance with said customer behaviors for use in said computing operation;

determine relationships between said performance indicators and said various prices; and utilize said relationships to select said price for said product segment for implementation by said financial institution;

wherein one of said customer behaviors is a line-increase behavior, the computer system further to:

initiate a line-increase propensity model for said line-increase behavior, one of said performance indicators for said line-increase propensity model being a quantity of line-increase occurrences for said loans; and ascertain from said line-increase propensity model one of said relationships, said one relationship correlating said quantity of line-increase occurrences with said various prices for said loans.

\* \* \* \* \*